United States Patent
Minatogawa

(10) Patent No.: US 7,460,151 B2
(45) Date of Patent: Dec. 2, 2008

(54) IMAGE FILE SHARING METHOD, AND DIGITAL CAMERA AND CENTER SERVER USED IN IMAGE FILE SHARING SYSTEM

(75) Inventor: Hiroshi Minatogawa, Asaka (JP)

(73) Assignee: Fujifilm Corporation, Tokyo (JP)

( * ) Notice: Subject to any disclaimer, the term of this patent is extended or adjusted under 35 U.S.C. 154(b) by 707 days.

(21) Appl. No.: 11/071,115

(22) Filed: Mar. 4, 2005

(65) Prior Publication Data

US 2005/0213147 A1    Sep. 29, 2005

(30) Foreign Application Priority Data

Mar. 29, 2004  (JP) ............................ 2004-093964
Mar. 31, 2004  (JP) ............................ 2004-101782

(51) Int. Cl.
*H04N 5/225* (2006.01)
(52) U.S. Cl. .............. 348/207.1; 348/231.2; 348/231.3; 348/231.6; 348/231.9
(58) Field of Classification Search ............. 348/207.1, 348/231.2, 231.3, 231.6, 231.9
See application file for complete search history.

(56) References Cited

U.S. PATENT DOCUMENTS

| 6,670,933 | B1 * | 12/2003 | Yamazaki | 345/1.1 |
| 7,187,407 | B2 * | 3/2007 | Kanehiro et al. | 348/231.3 |
| 2004/0070678 | A1 * | 4/2004 | Toyama et al. | 348/231.3 |
| 2004/0172451 | A1 * | 9/2004 | Biggs et al. | 709/206 |

FOREIGN PATENT DOCUMENTS

JP    2003-6032 A    1/2003

* cited by examiner

*Primary Examiner*—David Ometz
*Assistant Examiner*—Quang V Le
(74) *Attorney, Agent, or Firm*—Birch, Stewart, Kolasch & Birch, LLP

(57) ABSTRACT

Group keys and image group names of image groups to which the owner of a digital camera belongs are transmitted from a server to the digital camera. The image group names are displayed in list form and an image group name is selected from the list. The group key of the selected image group is transmitted from the digital camera to the server. The server sends the digital camera access information for accessing the user computer of another user who belongs to the image group identified by the received group key. The digital camera accesses the user computer based upon the access information and receives the image file desired.

6 Claims, 21 Drawing Sheets

Fig. 6

PEER INFORMATION DATABASE

| PEER ID \ INFORMATION | IP ADDRESS | PORT NO. | IMAGE GROUP 1 | IMAGE GROUP 2 | IMAGE GROUP 3 | ... |
|---|---|---|---|---|---|---|
| 001 | ○○○.×××.△△△ | 12 | G001 | G002 | G004 | ... |
| 002 | ×××.○○○.△△△ | 13 | G001 | G006 | G005 | ... |
| 003 | ○×○.△×△.××× | 14 | G007 | — | — | ... |
| ... | ... | ... | ... | ... | ... | ..... |
| 035 | ○△△.××.△○○× | 15 | G002 | G005 | G008 | ... |
| 036 | △×○.×○△.××× | 13 | G001 | G002 | G004 | ..... |
| ..... | ..... | ..... | | | | ..... |

GROUP KEY /
IMAGE GROUP NAME MANAGEMENT TABLE

| GROUP KEY | IMAGE GROUP NAME |
|---|---|
| G001 | SKIING |
| G002 | FLOWERS |
| G003 | SOCCER |
| G004 | WEDDING CEREMONY |
| G005 | TABLE TENNIS |
| G006 | BARBECUE |
| G007 | DIVING |
| G008 | RAILROADS |
| G009 | CAMERAS |
| ⋮ | ⋮ |

68

PEER-TO-PEER FOLDER

GROUP KEY / IMAGE GROUP NAME TABLE

| GROUP KEY | IMAGE GROUP NAME |
|---|---|
| G001 | SKIING |
| G002 | FLOWERS |
| G004 | WEDDING CEREMONY |
| G007 | BARBECUE |
| G009 | CAMERAS |

IMAGE FILE SHARING METHOD, AND DIGITAL CAMERA AND CENTER SERVER USED IN IMAGE FILE SHARING SYSTEM

BACKGROUND OF THE INVENTION

1. Field of the Invention

This invention relates to an image file sharing method, a digital camera used in an image file sharing system, and a center server used in such a system.

2. Description of the Related Art

The specification of Japanese Patent Application Laid-Open No. 2003-6032 describes a peer-to-peer content sharing system in which files are made available among individuals in an enterprise or between enterprises so that a one-on-one file exchange may be performed. With a peer-to-peer content sharing system, files generally are exchanged among computers without the intervention of a server or the like.

A digital camera is capable of obtaining digital image data representing the image of a subject in a comparatively simple manner by sensing the image of the subject. However, a digital camera that is capable of file sharing the digital image data obtained and a system that includes such a digital camera do not exist.

In addition, although there is a desire for the sharing of files only by a limited number of members, a digital camera with which such sharing of image files is realized also does not exist.

Also not available is a digital camera with which a shared image file, particularly a shared image file possessed by another user, can be ordered for printing directly (i.e., without first downloading the file or uploading the file to a server or the like).

DISCLOSURE OF THE INVENTION

Accordingly, an object of the present invention is to so arrange it that an image file that has been obtained by a digital camera can be disclosed to a group, which is composed of specific members, by using the digital camera.

Another object of the present invention is to so arrange it that only specific members can view a disclosed image using a digital camera.

A further object of the present invention is to so arrange it that an image that is based upon a shared image file can be printed directly through a network using a digital camera.

Still another object of the present invention is to so arrange it that an image that has been disclosed only to specific members can be printed directly through a network using a digital camera.

According to a first aspect of the present invention, the foregoing objects are attained by providing an image file sharing method implemented by a digital camera and a computer possessed by each of a plurality of users, and a center server capable of data communication with the digital cameras and computers via a network.

The center server stores, on a per-user basis, image group information specifying one or a plurality of image groups to which the user belongs, and access information for accessing each computer. Further each computer stores image group information specifying one or a plurality of image groups to which a user possessing the computer belongs. In the image file sharing method according to the present invention, each user possesses a digital camera and a computer. Accordingly, image group information of each user stored at the center server can also be described as image group information of each digital camera and computer possessed by the user.

In upload processing for uploading the image file, the digital camera receives the image group information specifying one or plurality of image groups from its own computer in the possession of the user who possesses this digital camera, and transmits to its own computer an image file, which has been obtained by image sensing using the digital camera, and image group information in which the image file is to be included. The own computer, which has received the image file and the image group information, stores the received image file in linkage with an image folder corresponding to the received image group information.

In download processing for downloading the image file, the digital camera receives from the center server the image group information specifying one or plurality of image groups to which the user possessing this digital camera belongs. If an identification code (ID) specific to the user of the digital camera (specific to the digital camera) is transmitted to the center server, then, on the basis of this identification code, the center server is capable of recognizing the information specifying one or plurality of image groups to which the user possessing this digital camera belongs. The digital camera accepts selection of any one item of image group information from among the image group information received, and the image group information selected is transmitted from the digital camera to the center server. The center server transmits, to the digital camera, access information for accessing other computers possessed by one or a plurality of other users (users other than the user possessing the above-mentioned digital camera) who belong to the image group specified by the image group information received.

The digital camera that has received this access information transmits the selected image group information to another computer based upon the access information received. The other computer that has received the image group information from the digital camera transmits an image file, which is linked to an image folder corresponding to the image group information received, to the digital camera.

According to the first aspect of the present invention, the foregoing objects are attained by providing a digital camera used in an image file sharing system constituted by the digital camera and a computer possessed by each of a plurality of users, and a center server capable of data communication with the digital cameras and computers via a network, wherein the center server has a management information storage device for storing, on a per-user basis, management information that includes image group information specifying one or a plurality of image groups to which the user belongs and access information for accessing each computer, and each computer has an image group information storage device for storing image group information specifying one or a plurality of image groups to which a user possessing the computer belongs, and an image file storage device for storing an image file, which is transmitted from a digital camera, in linkage with an image folder corresponding to image group information transmitted from the digital camera together with the image file. The digital camera comprises first image group information receiving means for receiving the image group information specifying one or plurality of image groups from its own computer in the possession of the user who possesses this digital camera; image file transmitting means for transmitting an image file, which has been obtained by image sensing using the digital camera, and image group information in which the image file is to be included, to its own computer; second image group information receiving means for receiving from the center server the image group information specifying one or plurality of image groups to which the user possessing this digital camera belongs; image group information selecting means for accepting selection of any one item of image group information from among the image group information received; image group information transmitting means for transmitting the image group information selected to the center server; access information receiving means for receiving access information, which is transmitted from the center server, for accessing other computers possessed by one or a plurality of other users who belong to the image group specified by the image group information received; accessing means for transmitting the selected image group information to another computer based upon the access information received; and image file receiving means for receiving an image file, which has been linked to an image folder corresponding to the image group information, transmitted from another computer that has received the image group information from the digital camera.

The digital camera preferably includes a removable memory card, and memory card control means for recording an image file, which has been received by the image file receiving means, on the memory card.

In the first aspect of the present invention, the digital camera has three processing functions.

The first processing function is a function for sensing the image of a subject and acquiring an image file that includes digital image data representing the image of the subject obtained by such image sensing.

The second processing function is a function for uploading an image file. In processing for uploading an image file, the digital camera communicates with its own computer. The digital camera's own computer is one possessed by the same owner who possesses the digital camera. The digital camera receives group image information to which the owner of the digital camera (the owner of the digital camera's own computer) belongs from its own computer and transmits the image file to be uploaded as well as the image group information in which this image file is to be included to its own computer. The image file thus uploaded is stored in this computer in linkage with an image folder that corresponds to the image group information.

The third processing function is a function for downloading an image file. With the function for downloading an image file, an image file that is transmitted from the computer of a user other than the owner of the digital camera (namely from another computer) is received by the digital camera. From the center server the digital camera receives image group information to-which the owner of the digital camera belongs and selects, from the image group information received, image group information to which the image file to be downloaded belongs. The image group information selected is transmitted to the center server. The latter transmits access information, which is for accessing the computer of another user (i.e., another computer) who belongs to an image group that is specified by the image group information received, to the digital camera. The latter accesses the other computer based upon the access information received and transmits the image group information selected. The other computer sends the accessing digital camera an image file that has been linked to an image folder corresponding to the image group information selected.

In accordance with the first aspect of the present invention, if the owner of a digital camera and another person who is the owner of another computer both belong to the same image group, an image file that has been acquired by a digital camera of the this other person and stored in the other computer can be downloaded. Image files can be exchanged between users belonging to the same image group.

Further, in accordance with the first aspect of the present invention, an image file that can be exchanged with another user (namely an image file that is disclosed) is one that has been uploaded to one's own computer from image files that have been acquired using a digital camera. If an image file that is not desired to be exchanged (disclosed) is not uploaded to one's own computer, then the image file will not be downloaded by another user (i.e., will not be disclosed to another user). Only an image file that is desired to be disclosed can be disclosed selectively.

In an embodiment, the digital camera further includes image group name display means for displaying an image group name on a display screen of a display unit based upon one or a plurality of items of image group information that have been received by the first image group information receiving means or second image group information receiving means. On the basis of an image group name that is displayed on the display screen, image group information in which an image file to be uploaded to one's own computer is caused to belong and image group information of an image file to be downloaded can be selected with ease.

The above-mentioned image file preferably includes original image data and thumbnail image data. The digital camera further includes thumbnail image data receiving means for receiving thumbnail image data in an image file, which has been linked to an image folder corresponding to an image group specified by the image group information, transmitted from another computer that has received image group information transmitted by the accessing means; thumbnail image display means for displaying a thumbnail image represented by the thumbnail image data; desired-image selecting means for selecting an image, for which download is desired, from thumbnail images displayed by the thumbnail image display means; and download request transmitting means for transmitting a download request to another computer having the selected image; wherein the image file receiving means receives an image file, for which download is desired, transmitted from the other computer that has received the download request. Since an image possessed by another user can be checked based upon a thumbnail image, an image file can be downloaded efficiently.

The first aspect of the present invention also provides the above-described center server used in an image file sharing system. The center server according this aspect of the present invention is used in an image file sharing system constituted by a digital camera and a computer possessed by each of a plurality of users, and a center server capable of data communication with the digital cameras and computers via a network. The center server comprises image group information/access information storage means for storing, on a per-user basis, image group information specifying one or a plurality of image groups to which the user belongs and information for accessing each of the computers; image group information transmitting means for transmitting to the digital camera the image group information specifying one or plurality of image groups to which the user possessing the digital camera belongs; image group information receiving means for receiving any one item of image group information transmitted from a digital camera; and access information transmitting means for transmitting to the digital camera access information for accessing other computers possessed by one or a plurality of other users who belong to the image group specified by the image group information received.

According to a second aspect of the present invention, the foregoing objects are attained by providing a digital camera used in an image file sharing/printing system constituted by the digital camera and a computer possessed by each of a plurality of users, a center server capable of data communication with the digital cameras and computers via a network, and a printer capable of data communication with the digital cameras and computers via a network, wherein the center server has a management information storage device for storing, on a per-user basis, management information that includes image group information specifying one or a plurality of image groups to which the user belongs and access information for accessing each computer, each computer has an image file storage device for storing an image file, which includes thumbnail image data and original image data, in linkage with an image folder corresponding to one or a plurality of image groups to which a user possessing the computer belongs, and the printer has a communication unit which, on the basis of image specifying information and computer specifying information transmitted from the digital camera, accesses a computer specified by the computer specifying information and receives an image file specified by the image specifying information transmitted from the computer.

The digital camera according to the second aspect of the present invention comprises image group information receiving means for receiving, from the center server, the image group information specifying one or plurality of image groups to which the user possessing the digital camera belongs; image group information selecting means for accepting selection of any one item of image group information from among the items of image group information received; image group information transmitting means for transmitting the image group information selected to the center server; access information receiving means for receiving access information, which is transmitted from the center server, for accessing a computer or computers possessed by one or a plurality of other users who belong to the image group specified by the image group information selected; accessing means for transmitting the selected image group information to the one or plurality of computers based upon the access information received; thumbnail image data receiving means for receiving thumbnail image data, which is transmitted from a computer that has received the image group information from the digital camera, contained in an image file that has been linked to an image folder corresponding to an image group identified by the image group information; display means for displaying a thumbnail image represented by the thumbnail image data; selecting means for selecting an image, which is desired to be printed, from among thumbnail images displayed by the display means; and specifying information transmitting means for transmitting, to the printer, information specifying an image to be printed selected by the selecting means and information specifying a computer having an image file that represents the image to be printed.

A method of controlling a digital camera according to the second aspect of the present invention is for controlling a digital camera used in an image file sharing/printing system constituted by the digital camera and a computer possessed by each of a plurality of users, a center server capable of data communication with the digital cameras and computers via a network, and a printer capable of data communication with the digital cameras and computers via a network, wherein the center server has a management information storage device for storing, on a per-user basis, management information that includes image group information specifying one or a plurality of image groups to which the user belongs and access information for accessing each computer, each computer has an image file storage device for storing an image file, which includes thumbnail image data and original image data, in linkage with an image folder corresponding to one or a plurality of image groups to which a user possessing the computer belongs, and the printer has a communication unit which, on the basis of image specifying information and computer specifying information transmitted from the digital camera, accesses a computer specified by the computer specifying information and receives an image file specified by the image specifying information transmitted from the computer.

The digital camera according to the second aspect of the present invention is controlled so as to receive, from the center server, the image group information specifying one or plurality of image groups to which the user possessing the digital camera belongs; accept selection of any one item of image group information from among the items of image group information received; transmit the image group information selected to the center server; receive access information, which is transmitted from the center server, for accessing a computer or computers possessed by one or a plurality of other users who belong to the image group specified by the image group information selected; transmit the selected image group information to the one or plurality of computers based upon the access information received; receive thumbnail image data, which is transmitted from a computer that has received the image group information from the digital camera, contained in an image file that has been linked to an image folder corresponding to an image group identified by the image group information; display a thumbnail image represented by the thumbnail image data received; select an image, which is desired to be printed, from among thumbnail images displayed; and transmit, to the printer, information specifying a selected image to be printed and information specifying a computer having an image file that represents the image to be printed.

A digital camera receives thumbnail image data transmitted from the computer (another computer) of another user who belongs to an image group that same as that selected from one or a plurality of image groups to which the user of the digital camera belongs. Thumbnail images based upon this thumbnail image data are displayed on the digital camera. Information (e.g., image file names) specifying image and information (e.g., an address) specifying the other computer has been linked to the thumbnail image data. When an image to be printed is selected from the thumbnail images displayed, information (image specifying information) that specifies the selected image and information (computer specifying information) specifying a computer (another computer) having the image file of this image is transmitted from the digital camera to the printer.

On the basis of the image specifying information and computer specifying information transmitted from the digital camera, the printer access the computer specified by the computer specifying information and receives an image file specified by the image specifying information transmitted from the computer. The printer is capable of printing an image that is based upon the image file possessed by the computer of the other user selected using the digital camera.

In accordance with the second aspect of the present invention, a digital camera can be used to order the printing of an image based upon an image file possessed by another user who belongs to the same image group as that of the user of the digital camera. The image file representing the image to be printed is transmitted to a printer from the computer having the image file; only the thumbnail image data is transmitted to the digital camera. Since an image file representing an image to be printed need not be uploaded to the server, etc., there is no major increase in traffic with regard to the network and server, etc. A desired image to be printed can be selected (ordered for printing) in simple fashion using the digital camera.

An image file stored in linkage with an image folder of every image group stored in the image file storing device of a computer is, e.g., an image file that has been acquired by the digital camera of the user who possesses this computer. In this case, the image file is transmitted from the digital camera to the computer, linked to an image folder corresponding to a specific image group and stored in the image file storing device of the computer. It is possible to print an image that is based upon an image file that another user has obtained by photography using a digital camera.

In an embodiment, the digital camera further comprises print-number designating means for designating number of prints of an image to be printed. The specifying information transmitting means sends the printer information representing number of prints. Thus the printer is capable of printing out the number of desired prints of an image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 illustrates an example of a peer information database;

FIG. 7 illustrates an example of a group key/image group name management table;

DESCRIPTION OF THE PREFERRED EMBODIMENTS

Preferred embodiments of the present invention will now be described in detail with reference to the accompanying drawings.

First Embodiment

Figure 1:
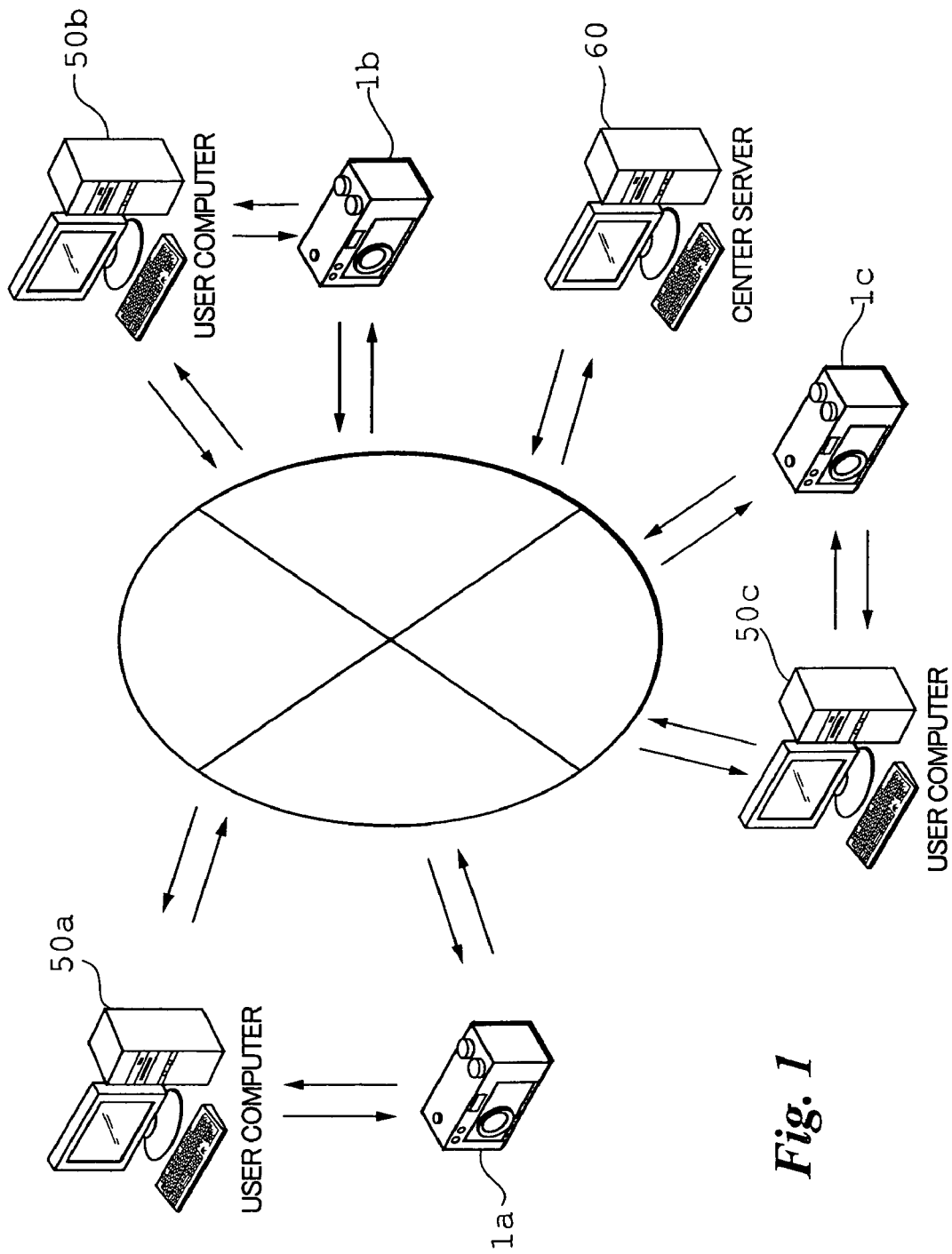
FIG. 1 is a diagram illustrating the overall configuration of an image file sharing system.

FIG. 1 illustrates the overall configuration of an image sharing system according to a first embodiment of the present invention.

The image sharing system comprises digital cameras, user computers and a center server that are capable of being connected to a network (the Internet). The image sharing system can be made to incorporate a number of digital cameras, a number of user computers and a single center server. In FIG. 1, three digital cameras 1a to 1c, three user computers 50a to 50c and one center server 60 are mutually interconnected via the network. In the first embodiment, it is assumed that the digital camera 1a and user computer 50a are possessed by the same owner, and that the same is true for digital camera 1b and user computer 50b and for digital camera 1c and user computer 50c. The center server 60 is placed under the supervision of the administrator of the image sharing system.

With the image sharing system, an image file that has been obtained by a digital camera can be transmitted to a user computer via the network and stored on the hard disk of the user computer. Further, as will be described later, a group (an image group) to which members utilizing the image sharing system belong is formed by the image sharing system. A utilizing member who belongs to a certain image group can download an image file, which is possessed by another utilizing member who belongs to the same image group, from the user computer of this other utilizing member using a digital camera and can view the image that is based upon the downloaded image file using the digital camera. Conversely, if an image group is one to which a person does not belong, then the person cannot download an image file possessed by another utilizing member who belongs to this image group.

The downloading of an image file is performed by peer-to-peer communication in this embodiment. That is, an image file possessed by another utilizing member who belongs to the same image group is not downloaded from the user computer of this utilizing member via the center server 60, etc. Rather, the image file can be downloaded to the digital camera through the network.

Figure 2:
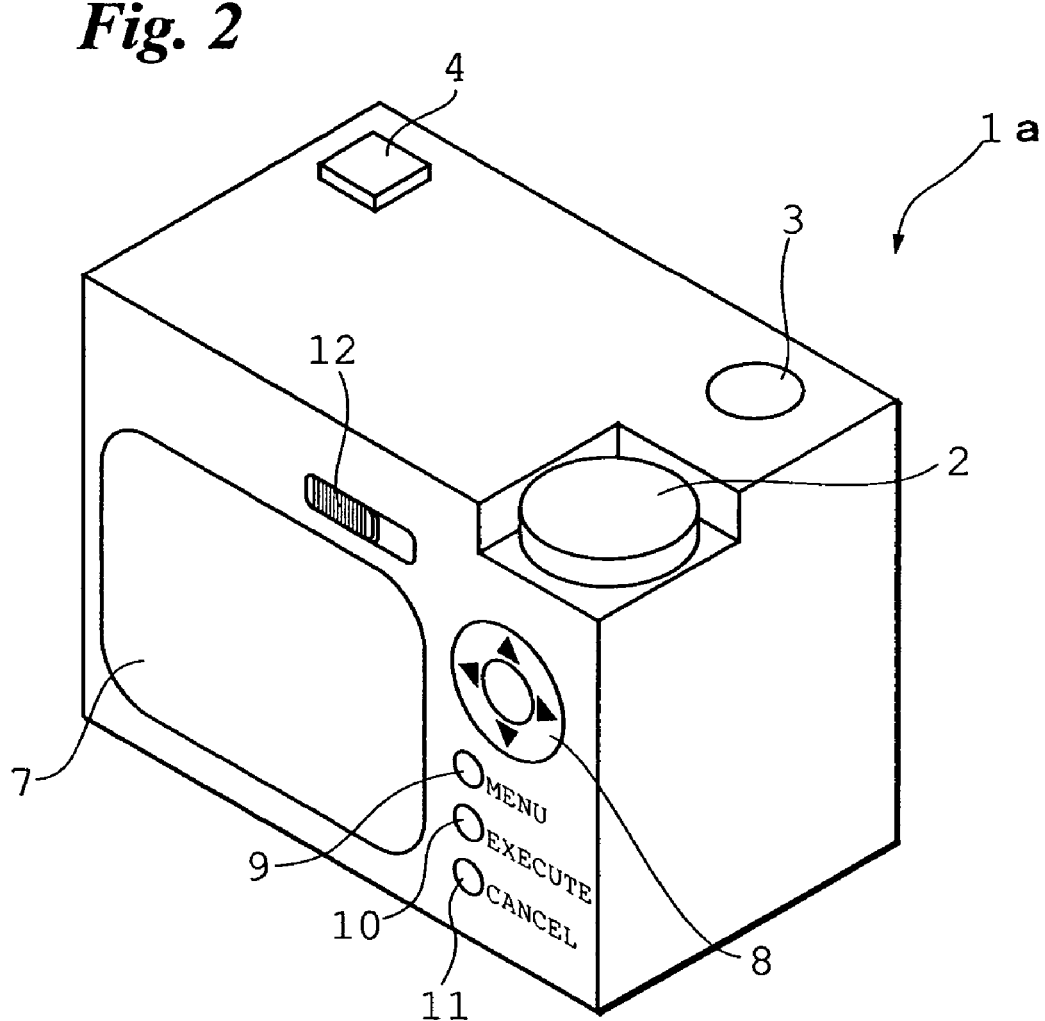
FIG. 2 is a perspective view illustrating the back side of a digital camera.

FIG. 2 is a perspective view showing the back side of the digital camera 1a. The digital cameras 1b and 1c also have a structure that is basically identical with that of the digital camera 1a. The digital camera 1a will be described as representative of the digital cameras 1a to 1c.

Provided on the top of the digital still camera 1a is a shutter-release button 3 disposed at the right-hand corner of the camera. A mode selection dial 2 is provided on the top of the digital camera 1a at the right-hand corner. The mode selection dial 2 is for selecting a shooting mode, a play back mode and a communication mode, etc. An antenna 4 for wireless communication is provided on the top of the digital camera 1a at the left-hand corner.

A display screen 7 of a liquid crystal display device is provided on the back side of the digital camera 1a substantially at the center thereof. Displayed on the display screen 7 are an image captured by an image sensing unit, an image represented by an image file that has been read out of a memory card inserted into the digital camera 1a, and an image for making various settings relative to the digital camera 1a, etc. The display screen 7 also functions as a touch-sensitive panel (input unit).

A power switch 12 is provided above the display screen 7. Provided on the right side of the display screen 7 are an up, down, left, right key 8 utilized to select a frame to be display on the display screen 7 and to make various settings, a menu button 9, an execute button 10 and a cancel button 11.

Figure 3:
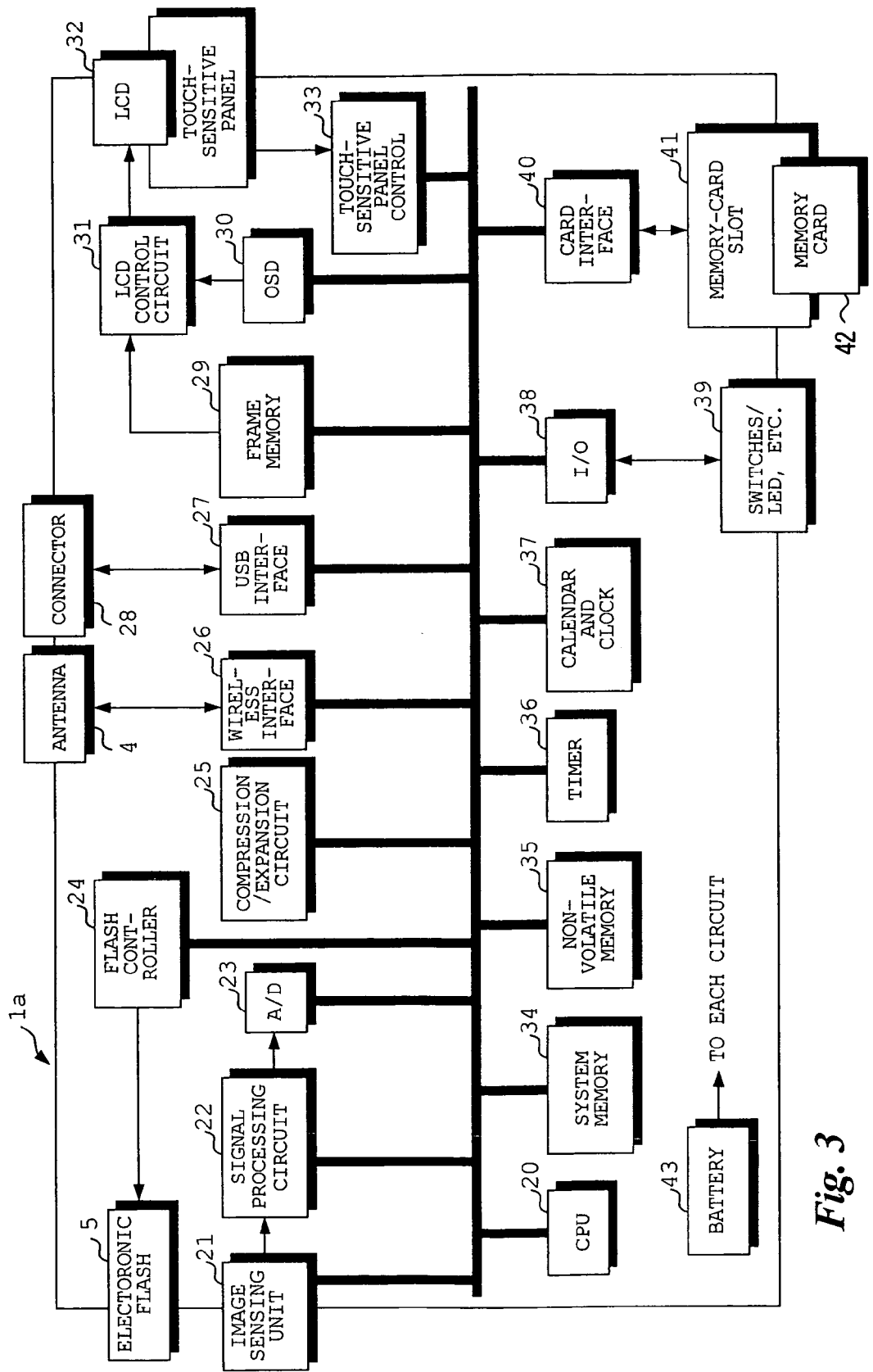
FIG. 3 is a block diagram showing the overall structure of a digital camera.

FIG. 3 is a block diagram illustrating the hardware implementation of the digital camera 1a.

The overall operation of the digital camera 1a is controlled by a CPU 20. A battery 43 supplies power to the CPU 20 and various other circuits and devices included in the digital camera 1a.

The digital camera 1a includes a system memory 34 and a non-volatile memory 35. A program and data, etc., for controlling the operation of the digital camera 1a have been stored in the system memory 34. A program and data for peer-to-peer communication and other programs and data have been stored in the non-volatile memory 35. A timer 36 is used to measure elapsed time when photography is performed using a self-timer. Date and time are measured by a calendar and clock 37.

Output signals from the mode selection dial 2, shutter-release button 3, up, down, left, right key 8, menu button 9, execute button 10, cancel button 11 and power switch button 12 (assumed to be a switch 39 in FIG. 3) are input to the CPU 20 via an input/output (I/O) unit 38. If the digital camera 1a has been provided with a light-emitting diode (LED), a light-emission signal is output to the light-emitting element via the input/output unit 38.

An electronic flash device 5 has its light emission controlled by a flash controller 24.

If the shooting mode is selected by the mode selection dial 2, the image of the subject is sensed by a CCD incorporated in an image sensing unit 21. A video signal representing the image of the subject is output from the image sensing unit 21 to a signal processing circuit 22, which proceeds to execute predetermined signal processing. The analog video signal that has been output from the signal processing circuit 22 is converted to digital image data in an analog/digital converting circuit 23.

The digital image data is input to an LCD (Liquid Crystal display) control circuit 31 via a frame memory 29 and is converted in the LCD control circuit 31 to data suited to an LCD display. Output data from the LCD control circuit 31 is applied to a liquid crystal display device 32. An image is display on the display screen 7 included in the liquid crystal display device 32.

Also input to the LCD control circuit 31 is an on-screen signal from an OSD (On-Screen Device) 30. Characters standing for date and time represented by the on-screen signal and an image representing a character can be displayed the display screen 7 in a form superimposed on the captured image.

As mentioned above, the display screen 7 included in the liquid crystal display device 32 also functions as a touch-sensitive panel. The output signal from the display screen 7 is input to the CPU 20 via a touch-sensitive-panel control circuit 33.

If the shutter-release button 3 is pressed when the shooting mode has been selected by the mode selection dial 2, the image data obtained as described above is stored temporarily in the frame memory 29. The image data is read out of the frame memory 29 and is compressed by a compression/expansion circuit 25. Image data (thumbnail image data) representing an image (thumbnail image) that is a reduction of the image represented by the image data is generated by the CPU 20. An image file that contains the compressed image data, thumbnail image data, file name and date and time of photography is created and the created image file is recorded on the memory card 42, which has been inserted into the memory-card slot 41, via the card interface 40.

If the playback mode is selected by the mode selection dial 2, the image file that has been recorded on the memory card 42 is read out and applied to the compression/expansion circuit 25 via the card interface 40. The compression/expansion circuit 25 executes expansion processing and inputs the expanded image data to the LCD control circuit 31 via the frame memory 29. The image represented by the image file that has been recorded on the memory card 42 is displayed the display screen 7.

The digital camera 1a is equipped with an antenna 4 for performing a wireless transmission. A wireless interface 26 is connected to the antenna 4. The sending and receiving of data is performed between the digital camera 1a and user computer 50a or the center server 60 via the antenna 4. Further, the digital camera 1a is provided with a USB interface 27 and a connector 28 connected to the USB interface 27. One end of a USB cable is connected to the connector 28 and the other end of the USB cable is connected to the user computer 50a. The digital camera 1a and user computer 50a are connected by the USB cable so as to be capable of communicating.

Figure 4:
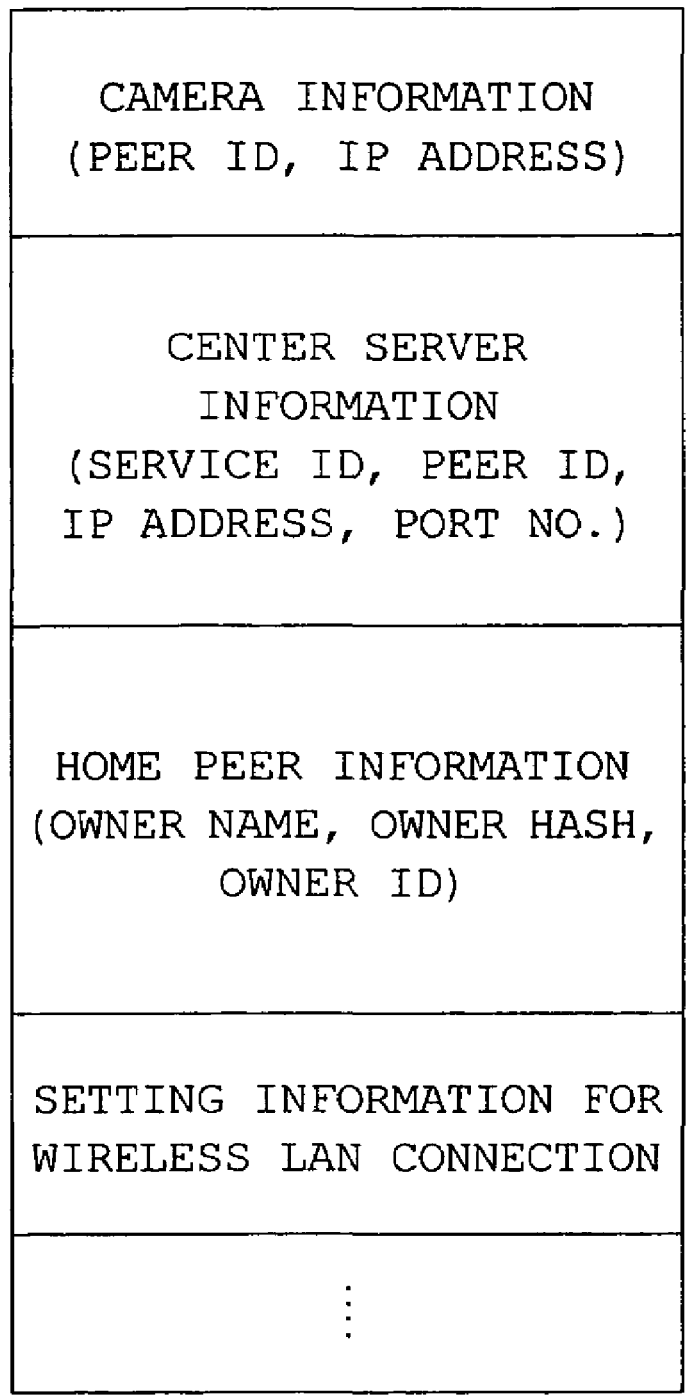
FIG. 4 illustrates part of the content of a non-volatile memory.

FIG. 4 illustrates part of the content of the non-volatile memory 35 with which the digital camera 1a is equipped.

In the image sharing system, the digital camera 1a performs data communication mutually with the center server 60 and with the user computer (the home peer) 50a in a manner described later. Information for performing data communication with the center server 60 and user computer 50a has been stored in the non-volatile memory 35. The following information (data) typically has been stored in the non-volatile memory 35:

(i) Camera information: This is information for specifying the digital camera 1a in the image sharing system; it includes the peer ID and the IP address of the digital camera 1a. The peer ID has been issued (generated) by the center server 60 and is specific to the digital camera 1a. The IP address is appended dynamically by the center server 60 (or by another DHCP server) according to the DHCP (Dynamic Host Configuration Protocol). The IP address may be a static IP address as a matter of course.

(ii) Center server information: This is information used to access the center server 60 and it includes a service ID, the peer ID of the center server 60, the IP address of the center server 60 and the port number of the center server 60.

(iii) Home peer information: This is information used to connect the digital camera 1a and the user computer (home peer) 50a via the network; it includes owner name, owner hash and owner ID.

(iv) Setting information for wireless LAN connection: This is information used to connect the digital camera 1a to the center server 60 and user computer (home peer) 50a by radio communication. The digital camera 1a is connected to the Internet by a wireless LAN and sends and receives data to and from the center server 60 and user computer (home peer) 50a. The setting information for the wireless LAN connection includes an ID for access point connection, a key for access point connection, a channel number for access point connection, connection mode information and setting information for IP acquisition.

Figure 5:
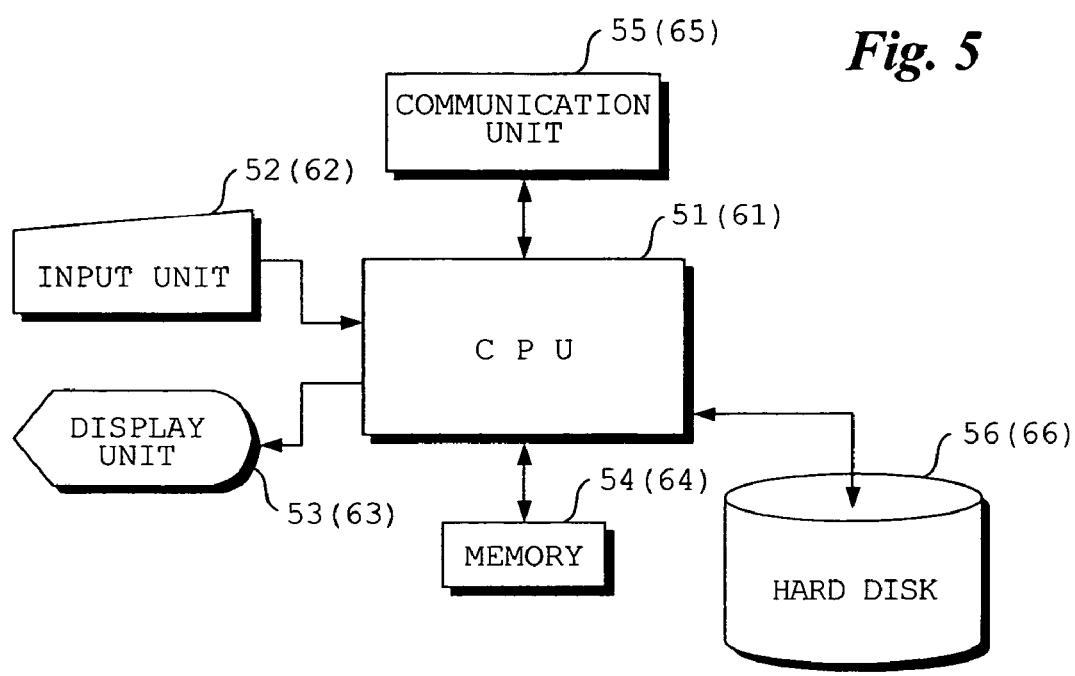
FIG. 5 is a block diagram illustrating the electrical structure of a user computer.

FIG. 5 is a block diagram illustrating the hardware implementation of the user computer 50*a*. The user computers 50*b* and 50*c* also have hardware implementations basically similar to that of the user computer 50*a*.

The user computer 50*a* includes a CPU 51. The overall operation of the user computer 50*a* is controlled by the CPU 51. The latter is equipped with an input unit (keyboard, mouse, etc.) 52 for inputting instructions and commands, etc., a display unit 53 for displaying text and images, etc., a memory 54 for supplying a work area and buffer area, etc., a communication unit 55 for sending and receiving data through the network, and a hard disk 56 for storing a program and data.

Stored on the hard disk 56 of user computer 50*a* in a manner similar to that of the digital camera 1*a* are information for specifying the user computer 50*a* [the peer ID and IP address specific to the user computer 50*a* (the IP address may be assigned dynamically or statically)], center server information (the service ID, peer ID, IP address and port number of the center server 60) and home peer information (owner name, owner hash and owner ID). If the user computer 50*a* is connectable to the network by a wireless LAN, then setting information for the wireless LAN connection also is stored on the hard disk 56 of the user computer 50*a* in a manner similar to that of the digital camera 1*a*. Further, as will be described later, other data for peer-to-peer communication (a peer-to-peer folder and a group key/image group name table) also is stored on the hard disk 56 of the user computer 50*a*.

The center server 60 also has a hardware implementation similar to that of the user computer 50*a* described above. The hardware of the center server 60 is indicated within the parentheses in FIG. 5. Stored on the hard disk 66 of the center server 60 are a program and data for managing the image sharing system (the IP address of the center server 60 as well as the port number and other data used in the image sharing system).

A peer information database 67 and a group key/group name management table 68 have been stored on a hard disk 66 of the center server 60 as data for managing the image sharing system. FIG. 6 illustrates an example of the peer information database 67, and FIG. 7 an example of the group key/group name management table 68.

Information (peer information) concerning every device (user computers and digital cameras) constructing the image sharing system has been stored in the peer information database 67 (see FIG. 6).

The peer information that has been stored in the peer information database 67 includes peer IDs, IP addresses, port numbers and group keys regarding respective ones of image groups 1, 2, 3, . . . .

Peer ID: This is an identification code that the center server 60 has appended to each user computer and digital camera that construct the image sharing system. The user computers and digital cameras that construct the image sharing system are identified by peer IDs.

IP address: This indicates the network address of each user computer and digital camera identified by a peer ID. If the IP address is appended by DHCP, then it is appended dynamically by the center server 60 (or by another DHCP server) when the user computer and digital camera are connected to the network. The IP address, therefore, is registered in the peer information database 67. In case of a user computer or digital camera that employs a static IP address, the IP address is registered in the peer information database 67.

Port number: This is a port number used in sending and receiving an image file in each user computer and digital camera and is set in each user computer and digital camera.

Image group: A group key for identifying an image group to which a utilizing member of the image sharing system belongs is registered in the image group section. A utilizing member can belong to one or a plurality of image groups.

In this embodiment, a utilizing member of the image sharing system possesses a user computer and a digital camera. The same group key is registered in the image group section of the peer information regarding the user computer and digital camera possessed by a certain utilizing member. That is, the group key of an image group to which a utilizing member of the image sharing group belongs is registered in the peer information regarding this user computer and digital camera possessed by the utilizing member.

The corresponding relationship between the above-described group keys and image group names is stored in the group key/group name management table 68 (see FIG. 7).

For example, a utilizing member who possesses a user computer having a peer ID "001" belongs to groups G001, G002 and G004, as shown in FIG. 6. A group name "Skiing" corresponds to group key "G001", a group name "Flowers" corresponds to group key "G002", and a group name "Wedding Ceremony" corresponds to group key "G004". Thus it will be understood that a utilizing member possessing a user computer of peer ID "001" is one who belongs to each of the image groups "Skiing", "Flowers" and "Wedding Ceremony".

Figures 8A, 8B:
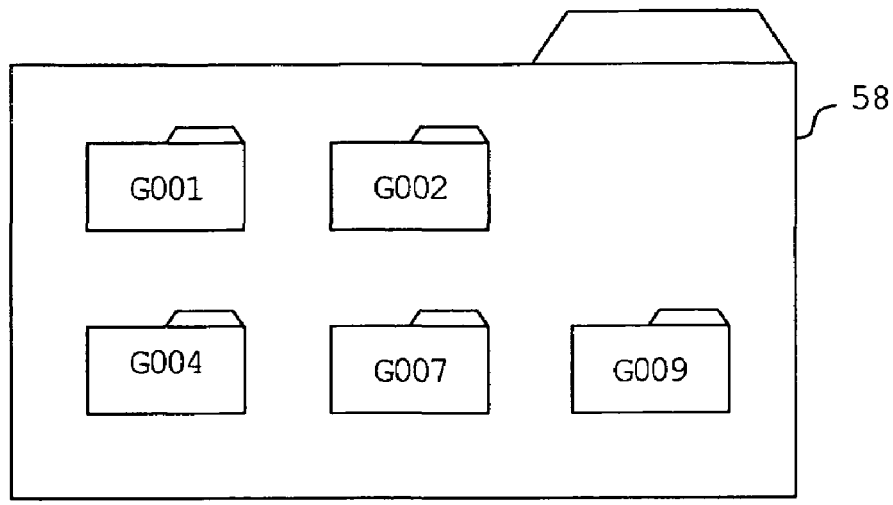
FIG. 8A schematically illustrates a peer-to-peer folder.
FIG. 8B illustrates an example of a group key/image group name table.

FIG. 8A schematically illustrates the content of a peer-to-peer folder 58 that has been stored on the hard disk 56 of a user computer (assumed to be user computer 50*a*). FIG. 8B illustrates an example of a group key/image group name table 59 that has been stored on the hard disk 56 of the user computer 50*a*.

User computers 50*a* to 50*c* that construct the image sharing system each have a peer-to-peer folder 58. The latter is a folder that is accessible by peer-to-peer communication.

The folder of every image group is linked to the peer-to-peer folder 58. Folders (referred to as "image folders" below) regarding respective ones of the image folders corresponding to the group keys "G001", "G002", "G004", "G007" and "G009" are linked to the peer-to-peer folder 58 that has been stored on the hard disk 56 of the user computer 50*a* shown in FIG. 8A. Image files relating to an image group identified by a group key are linked to each image folder.

Image folders linked to the peer-to-peer folder 58 are provided in correspondence with respective ones of the image groups to which the owner of the user computer belongs. As will be described later, a system utilizing member who belongs to a certain image group can download, by peer-to-peer communication, an image file that has been linked to an image folder of this image group in the user computer of another utilizing member who belongs to this image group.

Group keys regarding respective ones of the image groups to which the owner of the user computer belongs and image group names are stored in linked form in the group key/image group name table 59 (see FIG. 8B). The five image folders whose group keys are "G001", "G002", "G004", "G007" and "G009" have been linked to peer-to-peer folder 58 of the user computer 50*a* (see FIG. 8A). That is, the owner of the user computer 50*a* belongs to the image groups whose group keys are "G001", "G002", "G004", "G007" and "G009". These group keys "G001", "G002", "G004", "G007" and "G009" and the image group names corresponding to respective ones of these group keys are stored in the group key/image group name table 59 of the user computer 50*a*.

(2) Operation of image sharing system

The operation of the image sharing system will now be described with reference to the flowcharts of FIGS. 9 to 12 and examples of screens on the display screen 7 of the digital camera shown in FIGS. 13 to 17.

(I) Processing for registering new image group

Figure 9:
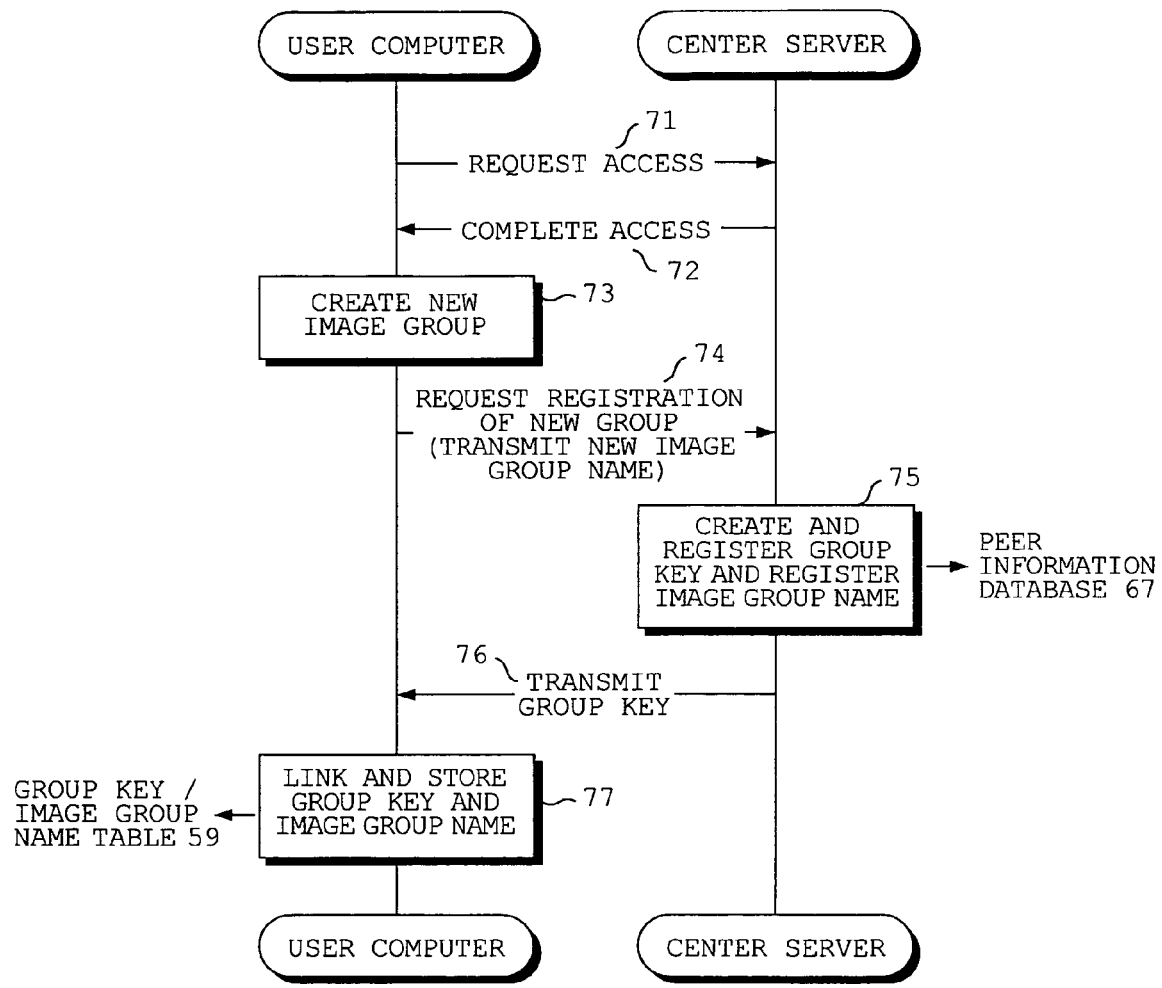
FIG. 9 is a flowchart illustrating the flow of processing for registering a new image group.

FIG. 9 is a flowchart illustrating processing executed by a user computer and center server 60 in processing for registering a new image group.

Processing for registering a new image group is processing by which a utilizing member of the image sharing system creates (registers) an image group using a user computer. This will be described with regard to a case where use is made of the user computer 50*a*.

Access request information is transmitted from the user computer 50*a* to the center server 60 (step 71). Information (peer ID and IP address) concerning the user computer 50*a* and center server information (service ID, peer ID, IP address and port number) has been stored on the hard disk 56 of the user computer 50*a* in the manner described above. The access request information is transmitted from the user computer 50*a* to the center server 60 based upon the center server information. Further, the access request information contains information (peer ID and IP address) concerning the user computer 50*a*.

On the basis of the information (peer ID) concerning the user computer 50*a* contained in the access request information, the center server 60 that has received the access request information refers to the peer information database 67 (FIG. 6) to determine whether the user computer 50*a* is a computer constituting the image sharing system (i.e., whether the user of the user computer 50*a* is a utilizing member of the image sharing system). Since the user computer 50*a* is one constituting the image sharing system (i.e., since the peer ID contained in the access request information has been registered in the peer information database 67), the center server 60 enables the connection of the user computer 50*a* and sends the user computer 50*a* data indicating that the connection has been completed (step 72).

Upon receiving the data indicating completion of connection from the center server 60, the user computer 50*a* executes processing for creating a new image group (step 73). In processing for creating a new image group, the user of the user computer 50*a* uses the input unit 52 to input the name of the image group to be created anew. New-group registration request information that contains the entered image group name is transmitted from the user computer 50*a* to the center server 60 (step 74).

Upon receiving the new-group registration request information, the center server 60 creates a group key. The created group key is registered in the image group section of the peer information in the peer information database 67 regarding the user computer 50*a* identified by the peer ID received from the user computer 50*a* beforehand. Furthermore, the center server 60 also registers the created group key in the image group section of the peer information in the peer information database 67 regarding the digital camera 1*a* possessed by the owner of the user computer 50*a*. (This is a case where the center server 60 has grasped the corresponding relationship between the peer IDs of the user computer and digital camera possessed by the same owner. Of course, the peer ID of the digital camera 1*a* may be included in the access request information together with the peer ID of the user computer 50*a* and the created group key may be registered in the peer information regarding the user computer 50*a* and digital camera 1*a* possessed by the same owner based upon these two peer IDs.) The created group key and the image group name contained in the received new-group registration request information are registered in correspondence with each other in the group key/group name management table 68 (see FIG. 7) (step 75).

The center server 60 transmits the created group key to the user computer 50*a* (step 76). The latter registers the received group key and the entered image group name in the group key/image group name table 59 (FIG. 8B) (step 77). Processing for registering the new image group then ends.

It may be so arranged that a group key created at the center server 60 and transmitted to the user computer 50*a* is transmitted upon being encrypted. In this case, the encrypted group key is decoded at the user computer 50*a* and registered in the group key/image group name table 59.

It goes without saying that in a case where a new image group has been created using the user computer 50*a*, an image folder corresponding to the newly created image group is created in the peer-to-peer folder 58 (FIG. 8A) of the user computer 50*a*.

(II) Processing for participation in an image group

Figure 10:
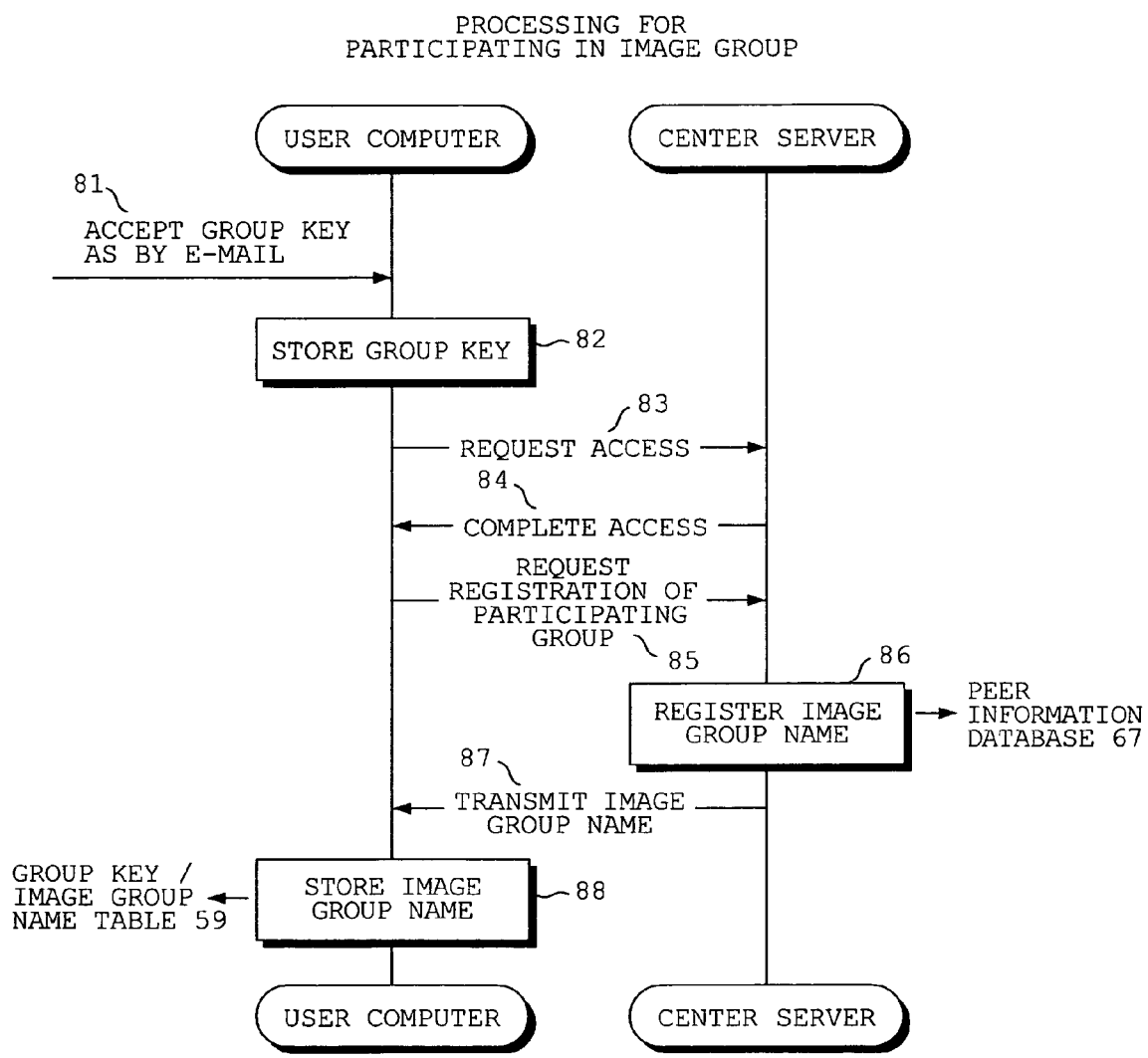
FIG. 10 is a flowchart illustrating the flow of processing for participation in an image group.

FIG. 10 is a flowchart illustrating the flows of processing executed by a user computer and center server 60 for participation in an image group.

Processing for participation in an image group is processing executed in a case where a utilizing member of the image sharing system participates in an image group created by the above-described processing (FIG. 9) for registering a new image group. This will be described with regard to a case where use is made of the user computer 50*a*.

A utilizing member who wishes to participate in an image group accepts as by e-mail the group key of the image group in which participation is desired from the utilizing member who created the image group (step 81). Of course, the group key may be accepted from another utilizing member who received the group key from the utilizing member who created the image group.

The group key accepted as by e-mail is registered in the group key/image group name table 59 (FIG. 8B) at the user computer 50*a* (step 82).

Access request information is transmitted from the user computer 50*a* to the center server 60 (step 83). Upon allowing access, the center server 60 transmits the fact that access has been achieved to the user computer 50*a* (step 84).

The user computer 50*a* sends the center server 60 information requesting registration of the desired participation group (step 85). This information requesting registration of the desired participation group includes the group key of the image group in which participation is desired, the group key having been received as by e-mail and registered in the group key/image group name table 59 in advance in the manner described above.

Upon receiving the information requesting registration of the desired participation group, the center server 60 registers the group key, which is contained in the information requesting registration of the desired participation group, in the image group section of the peer information regarding the user computer 50*a* and digital camera 1*a* in the peer information database 67 (step 86). Further, the center server 60 refers to the group key/group name management table 68 and sends the user computer 50*a* the image group name corresponding to the registered group key (step 87).

The user computer 50*a* stores the received image group name in the group key/image group name table 59 in a form linked to the group key (step 88). This ends the processing for participating in an image group.

As a result of the above-described processing for registering a new image group (FIG. 9) and processing for participating in an image group (FIG. 10), the group key of an image group in which a utilizing member of the image sharing system is participating is registered in the peer information concerning the user computer and digital camera possessed by the utilizing member of the image sharing system. One or a plurality of image groups in which each utilizing member of the image sharing system is participating is (are) registered at the center server 60. The corresponding relationship between group keys and image group names regarding all image groups created in the image sharing system is registered in the group key/group name management table 68. The corresponding relationship between group keys and image group names regarding image groups in which the user of each user computer is participating is registered at each user computer.

(III) Processing for registering an image file (upload processing)

Figure 11:
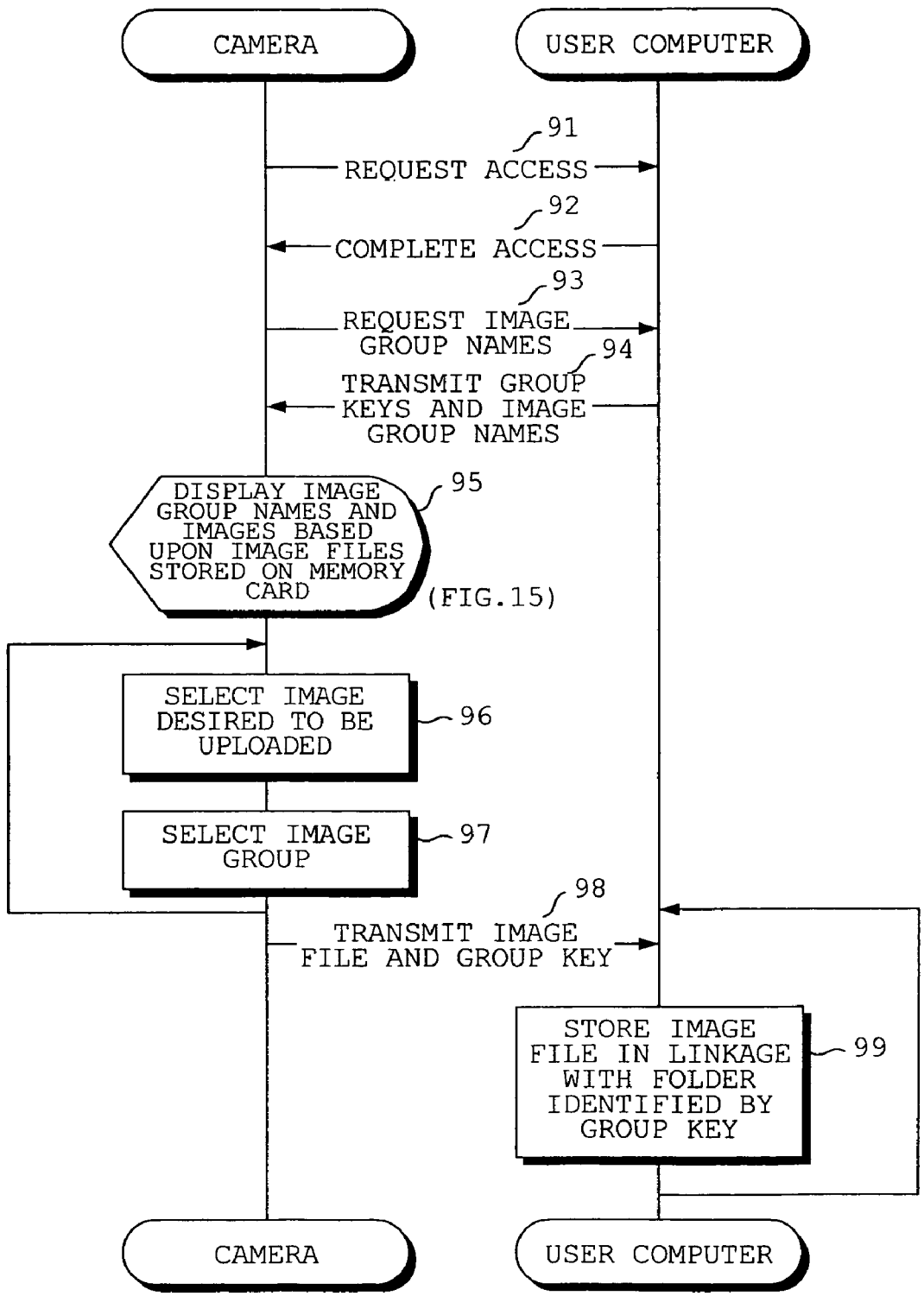
FIG. 11 is a flowchart illustrating the flow of processing for registering an image file.
Figure 13:
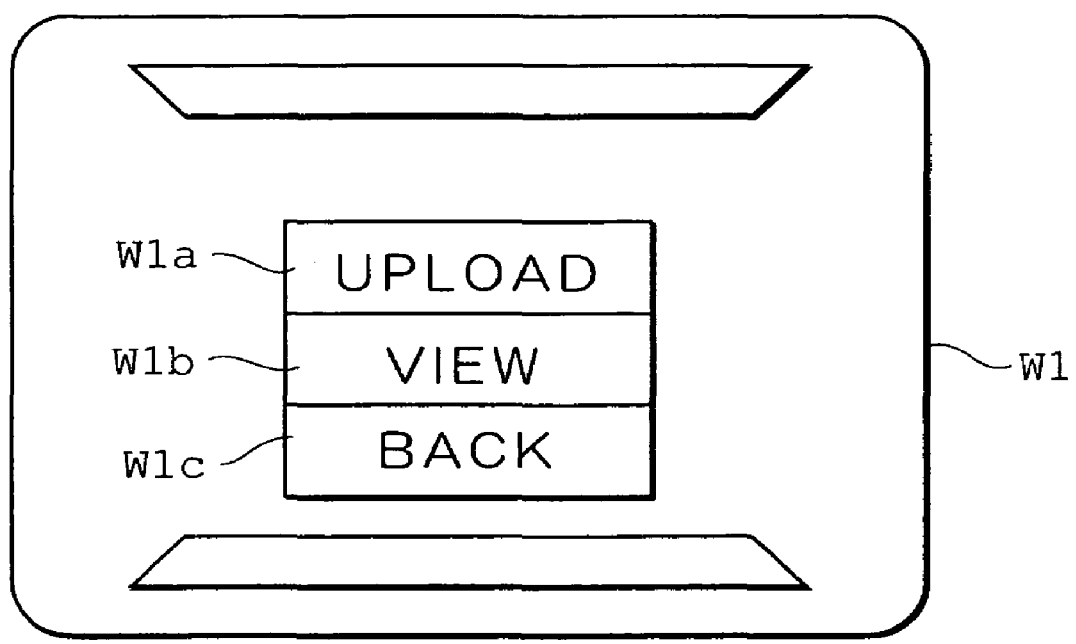
FIG. 13 illustrates an example of an initial screen.
Figure 14:
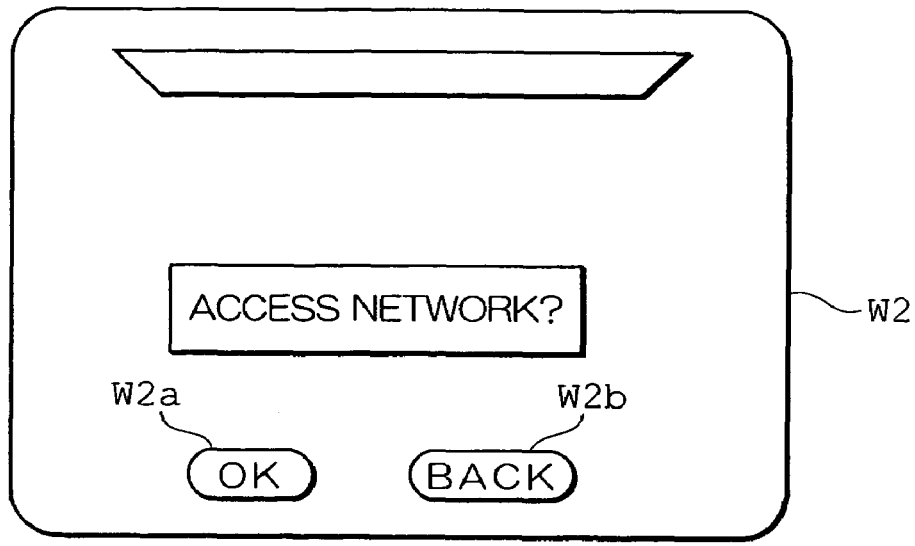
FIG. 14 illustrates an example of a network connection screen.
Figure 15:
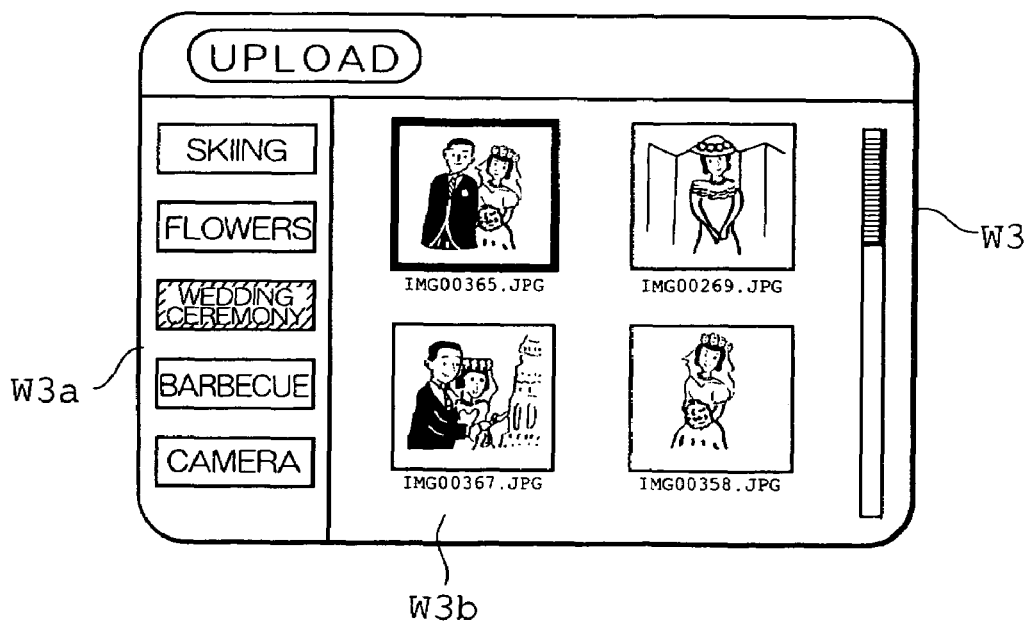
FIG. 15 illustrates an example of an upload screen.

FIG. 11 is a flowchart illustrating the flows of processing executed by a digital camera and user computer for registering an image file. FIGS. 13 to 15 illustrate examples of screens displayed on the display screen 7 of a digital camera in this processing for registering an image file.

Processing for registering an image file is processing whereby a utilizing member of the image sharing system takes a picture of a subject using a digital camera and stores an image file, which has been recorded on the memory card 42 as a result, on the hard disk of the user computer possessed by this utilizing member. This will be described with regard to a case where use is made of the digital camera 1a and user computer 50a.

If the communication mode is selected using the mode selection dial 2 of the digital camera 1a, an initial screen W1 is displayed the display screen 7 of the digital camera 1a, as illustrated in FIG. 13.

The initial screen W1 includes three selectable areas, namely "UPLOAD" W1a, "VIEW" W1b and "BACK" W1c. Any one of "UPLOAD" W1a, "VIEW" W1b and "BACK" W1c can be selected by operating the up, down, left, right key 8 or by touching the display screen 7. "UPLOAD" W1a is selected in image file registration processing.

If "UPLOAD" W1a is selected, a network connection screen W2 (see FIG. 14) instead of the initial screen W1 appears on the display screen 7. The network connection screen W2 includes an "OK" button W2a and a "BACK" button W2b. If the "OK" button W2a is selected, a transition is made to the processing described next. If the "BACK" button W2b is pressed, the initial screen W1 is displayed the display screen 7 again.

As mentioned above, information (home peer information) necessary for data communication with the user computer 50a (home peer) has been stored in the non-volatile memory 35 (FIG. 4) of the digital camera 1a. Access request information is transmitted from the digital camera 1a to the user computer 50a based upon the home peer information via a network (step 91). The access request information transmitted from the digital camera 1a to the user computer 50a includes camera information (peer ID and IP address) that has been stored in the non-volatile memory 35.

Upon receiving the access request information from the digital camera 1a, the user computer 50a sends the digital camera 1a data representing the fact that access has been achieved (step 92).

Information requesting image group names is transmitted from the digital camera 1a to the user computer 50a (step 93). Upon receiving the information requesting image group names, the user computer 50a sends the digital camera 1a the sets of all group keys and image group names that have been stored in the group key/image group name table 59 (step 94).

The group keys and image group names are stored temporarily in the non-volatile memory 35 of the digital camera 1a.

An upload screen W3 (see FIG. 15) is displayed the display screen 7 of the digital camera 1a (step 95).

The upload screen W3 includes an image group name display area W3a and an image display area W3b. Image group names that have been transmitted from the user computer 50a are displayed in the image group name display area 3a in list form. The image group names displayed in the image group name display area W3a are based upon the image group names that have been stored in the non-volatile memory 35. Thumbnail images based upon the image files that have been recorded on the memory card 42 are displayed in the image display area W3b.

The user of the user computer 50a selects the image desired to be uploaded from among the thumbnail images being displayed in the image display area W3b and selects the group name of the image group in which the selected image is to be included from among the image group names being displayed in the image group name display area W3a (steps 96, 97). If a plurality of images are to be uploaded, the selection of the image and the selection of the image group name are repeated.

If the execute button 10 is pressed, the image file representing the selected image is read out of the memory card 42 and the group key of the selected image group is read out of the non-volatile memory 35. The image file and the group key are linked and transmitted from the digital camera 1a to the user computer 50a (step 98).

Upon receiving the image file and the group key, the user computer 50a stores the received image file in linkage with the image folder inside the peer-to-peer folder 58 (see FIG. 8A) identified by the group key (step 99). This ends the processing for registering an image file.

(IV) Image file acquisition processing (view mode processing)

Figure 12:
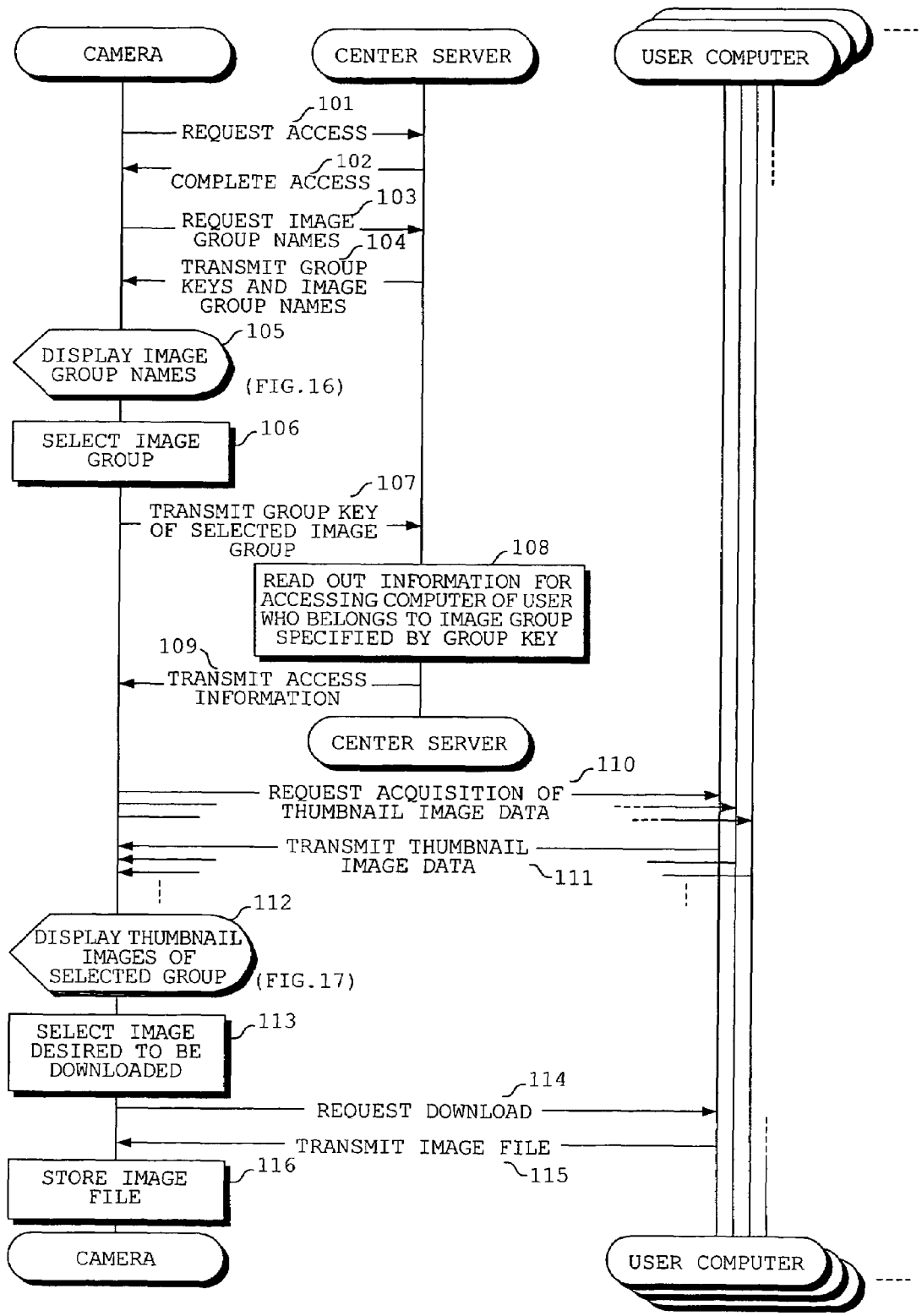
FIG. 12 is a flowchart illustrating the flow of processing for acquiring an image file.
Figure 16:
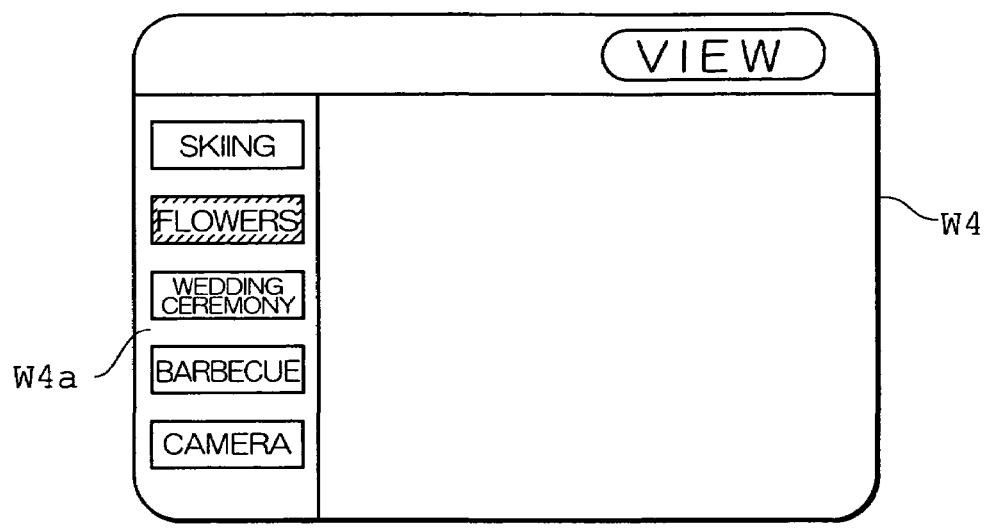
FIG. 16 illustrates an example of an image group selection screen.
Figure 17:
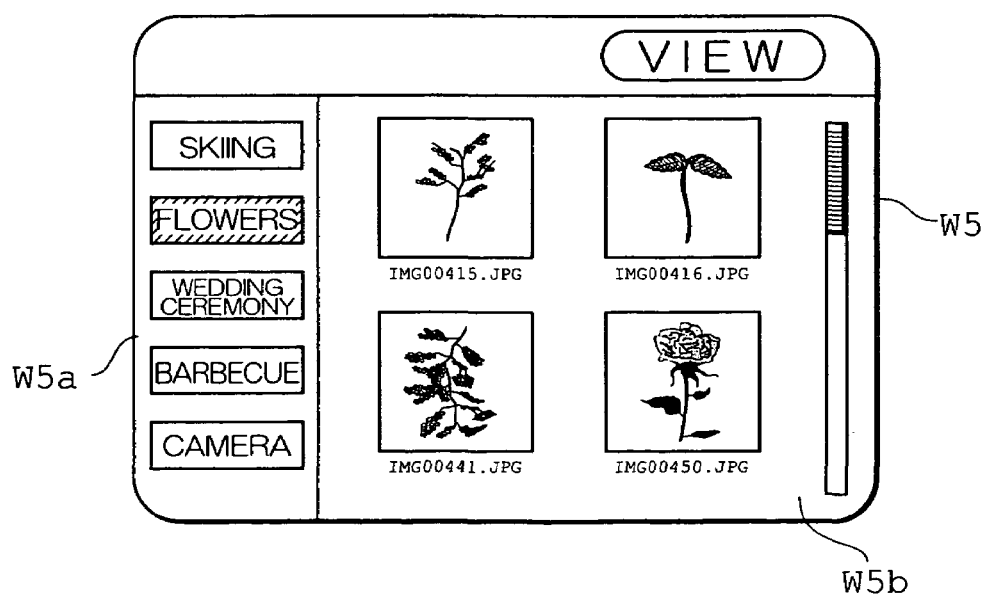
FIG. 17 illustrates an example of a download screen.

FIG. 12 is a flowchart illustrating the flows of processing executed by a digital camera, center server and user computer for acquiring an image file, and FIGS. 16 and 17 illustrate examples of screens displayed the display screen 7 of the digital camera in image file acquisition processing.

Image file acquisition processing is processing by which a utilizing member acquires the image of another utilizing member who belongs to an image group that is the same as that to which the first-mentioned utilizing member belongs. This will be described with regard to a case where use is made of the digital camera 1a and user computer 50a.

When "VIEW" W1b is selected on the initial screen W1 (FIG. 13) and the "OK" button W2a is selected on the network connection screen W2 (FIG. 14), a transition is made to the processing described below.

Access request information is transmitted from the digital camera 1a to the center server 60 via the network (step 101). Center server information that has been stored in the non-volatile memory 35 of the digital camera 1a is used to transmit the access request information from the digital camera 1a to the non-volatile memory 35. The access request information includes information (peer ID and ID address) concerning the digital camera 1a.

In a manner similar to that of the case where processing for registering a new image group is executed, it is determined based upon information (peer ID) concerning the digital camera 1a whether the digital camera 1a is one constituting the image sharing system. Data indicating the fact that access has been achieved is transmitted from the center server 60 to the digital camera 1a, which is one constituting the image sharing system (step 102).

Request information requesting image group names is transmitted from the digital camera 1a to the center server 60 (step 103). Upon receiving this request information, the center server 60 refers to the peer information database 67 based upon the peer ID transmitted from the digital camera 1a, reads out the group keys of the image groups to which the owner of the digital camera 1a (the owner of the user computer 50a) belongs, reads the image group names that correspond to these group keys out of the group key/group name management table 68 and transmits the group keys and the image group names to the digital camera 1a (step 104). The group keys and the image group names are stored in the non-volatile memory 35 of the digital camera 1a.

An image group selection screen W4 shown in FIG. 16 is displayed the display screen 7 of the digital camera 1. The image group selection screen W4 includes an image group name display area W4a, in which the image group names that have been stored in the non-volatile memory 35 are display (step 105).

By operating the up, down, left, right key 8 or touching the display screen 7, the user of the digital camera 1a selects the image group name of the image group from which acquisition of an image is desired from among the image group names being displayed in the image group name display area W4b (step 106). The group key regarding the selected image group is read out of the non-volatile memory 35 and transmitted to the center server 60 (step 107).

Upon receiving the group key, the center server 60 goes to the peer information database 67 and reads out access information (peer IDs, IP addresses and port numbers) for accessing the user computers of the utilizing members belonging to the image group specified by the group key received (step 108). The access information read out is transmitted from the center server 60 to the digital camera 1a (step 109). It should be noted that if user computers are connected to a network and the IP addresses appended by the DHCP, then an IP address will not have been registered in peer information regarding a user computer that has not been connected to the network. It goes without saying that access information regarding such a user computer is not transmitted to the digital camera 1a. Further, it may be so arranged that the center server 60 accesses the user computer beforehand based upon access information read out, queries the user computer as to whether it is in an accessible state and, as a result of the query, sends the digital camera 1a only access information regarding a user computer that is accessible.

Upon receiving access information from the center server 60, the digital camera 1a, based upon the received access information, transmits access request information, which is for requesting thumbnail image data, to the user computers specified by the access information (step 110). Of course, this acquisition request information also contains the group key regarding the selected image group and camera information (peer ID and IP address) regarding the digital camera 1a.

Upon receiving the information transmitted from the digital camera 1a for the purpose of requesting acquisition of thumbnail image data, the user computer, based upon the group key contained in the acquisition request information, reads out thumbnail image data contained in the image files linked to the image folder regarding the image group identified by this group key, links its own IP address with the thumbnail image data and transmits the thumbnail image data to the digital camera 1a (step 111). If the digital camera 1a has received multiple items of access information from the center server 60, then the above-mentioned information for requesting acquisition of thumbnail image data is transmitted by the digital camera 1a to a plurality of user computers. In this case each of the plurality of user computers sends the digital camera 1a a set of data that includes the images (thumbnail image data) regarding the selected image group and the IP address.

Thumbnail images that are based upon the received thumbnail image data are displayed in an image display area W5b on the display screen 7 of the digital camera 1a (step 112; see download screen W5 in FIG. 17).

The owner of the digital camera 1a selects one or a plurality of images desired for downloading from among the thumbnail images being displayed in the image display area W5b (step 113). On the basis of the IP address that has been linked to the selected thumbnail image, download request information is transmitted to the user computer having the image file representing the selected thumbnail image (step 114). The download request information includes the image file name (contained in the thumbnail image data) for which download is requested.

Upon receiving the download request information, the user computer transmits the requested image file to the digital camera 1a (step 115). The image file transmitted from the user computer is recorded on the memory card 42 of the digital camera 1a (step 116).

Second Embodiment

Figure 18:
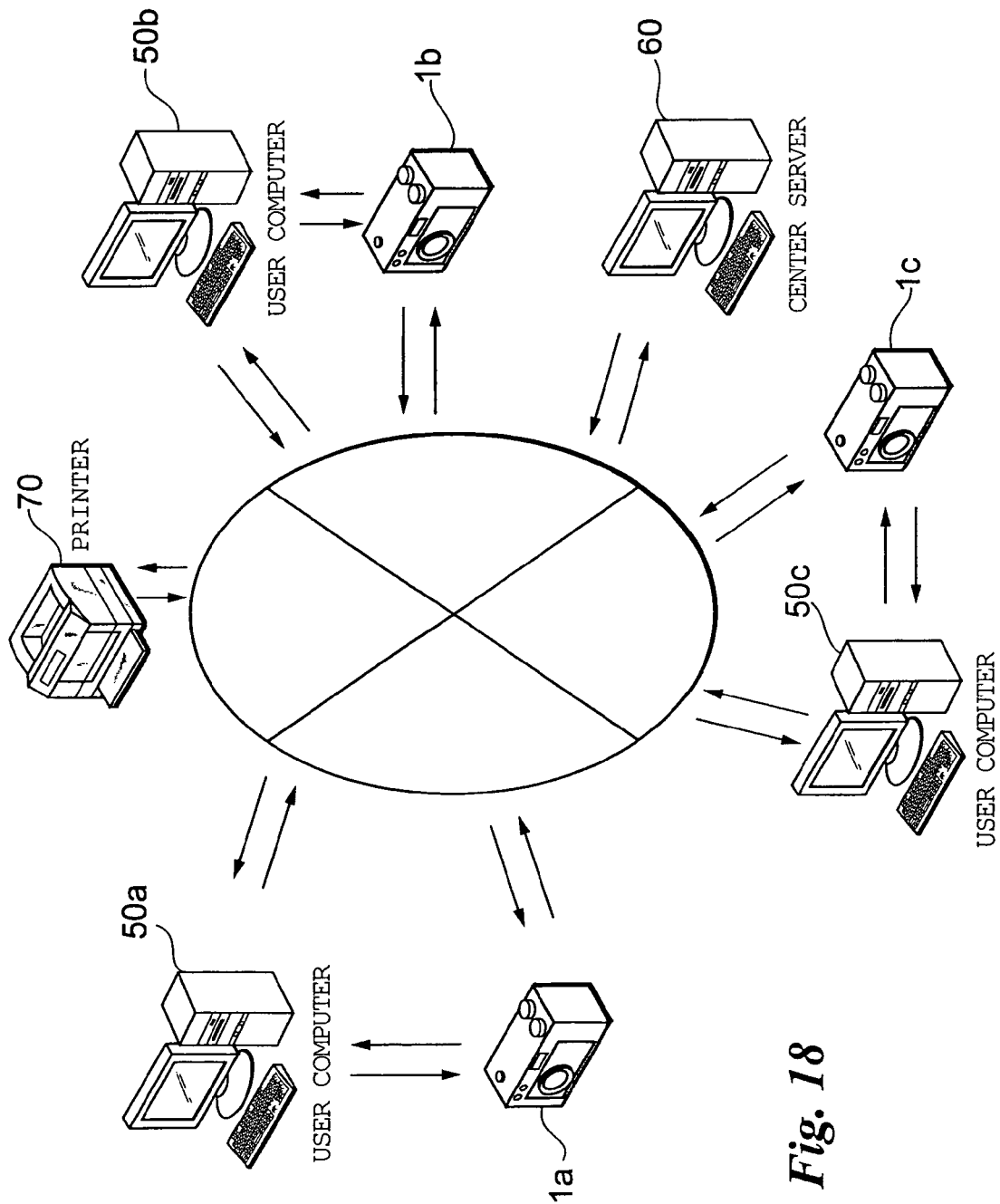
FIG. 18 is a diagram illustrating the overall configuration of an image sharing/printing system.

FIG. 18 is a diagram illustrating the overall configuration of an image sharing/printing system.

The image sharing/printing system comprises digital cameras, user computers, a center server and a printer that are capable of being connected to a network (the Internet). The image sharing/printing system can be made to incorporate a number of digital cameras, a number of user computers, a plurality of printers and a single center server. In FIG. 18, three digital cameras 1a to 1c, three user computers 50a to 50c, one center server 60 and one printer 70 are mutually interconnected via the network. This system differs from the image sharing system of the first embodiment (FIG. 1) in that the printer 70 has been connected to the network. In the description that follows, components identical with those of the first embodiment are designated by like reference characters and need not be described again.

With this image sharing/printing system, an image based upon an image file that has been recorded on a memory card inserted into a digital camera and an image file (stored in a user computer) that belongs to another utilizing member who belongs to the same image group can be printed from the printer 70 through use of the digital camera. This function is in addition to the functions of the image sharing system according to the first embodiment.

Figure 19:
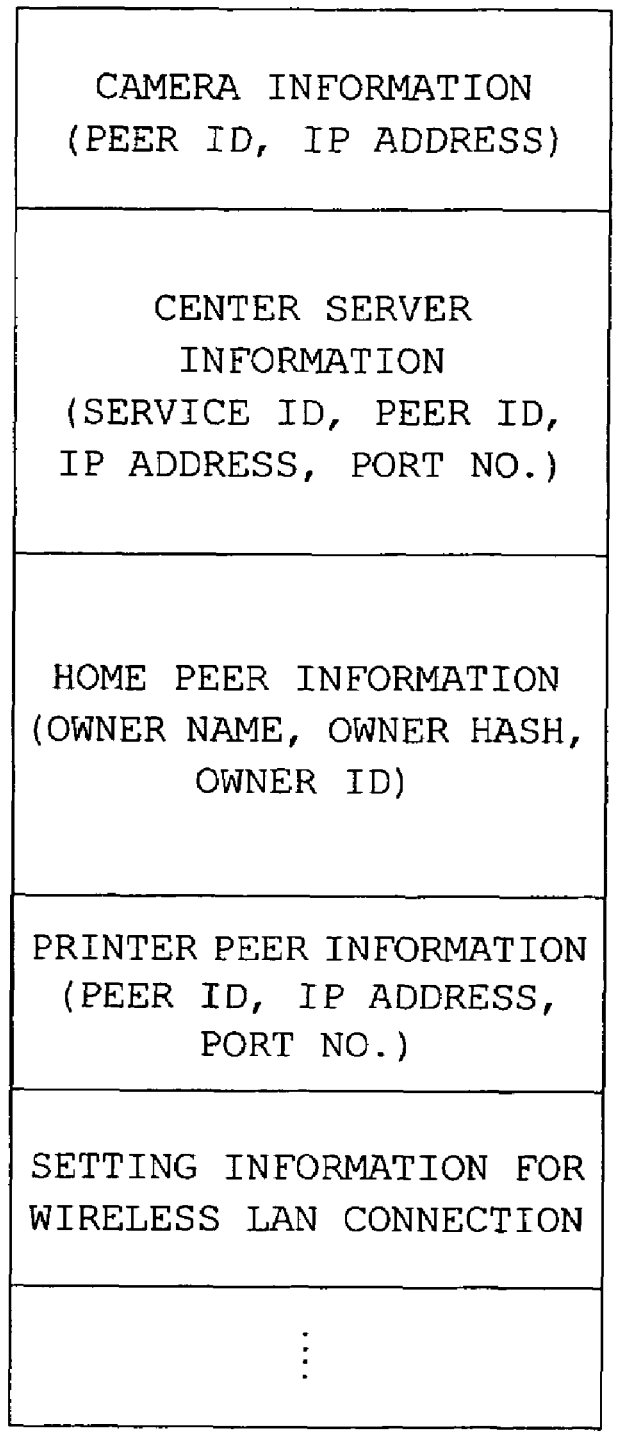
FIG. 19 illustrates part of the content of a non-volatile memory.

FIG. 19 illustrates part of the content of the non-volatile memory 35 with which the digital camera 1a is equipped. This content differs from that of the non-volatile memory 35 (FIG. 4) in the digital camera 1a of the first embodiment in that printer peer information has been added thereto.

Printer peer information is information used to connect the digital camera 1a and printer 70 via the network and it includes the peer ID of the printer 70, the IP address of the printer 70 and port number of the printer 70. The printer peer information is stored also on the hard disk of the user computer.

As in the first embodiment, processing (FIG. 9) for registering a new image group, processing (FIG. 10) for participating in an image group, processing (FIG. 11) for registering an image file and processing (FIG. 12) for acquiring an image file can be executed in the image sharing/printing system of the second embodiment as well. In addition to the above processing, print processing also can be executed in the image sharing/printing system of the second embodiment.

Figure 20:
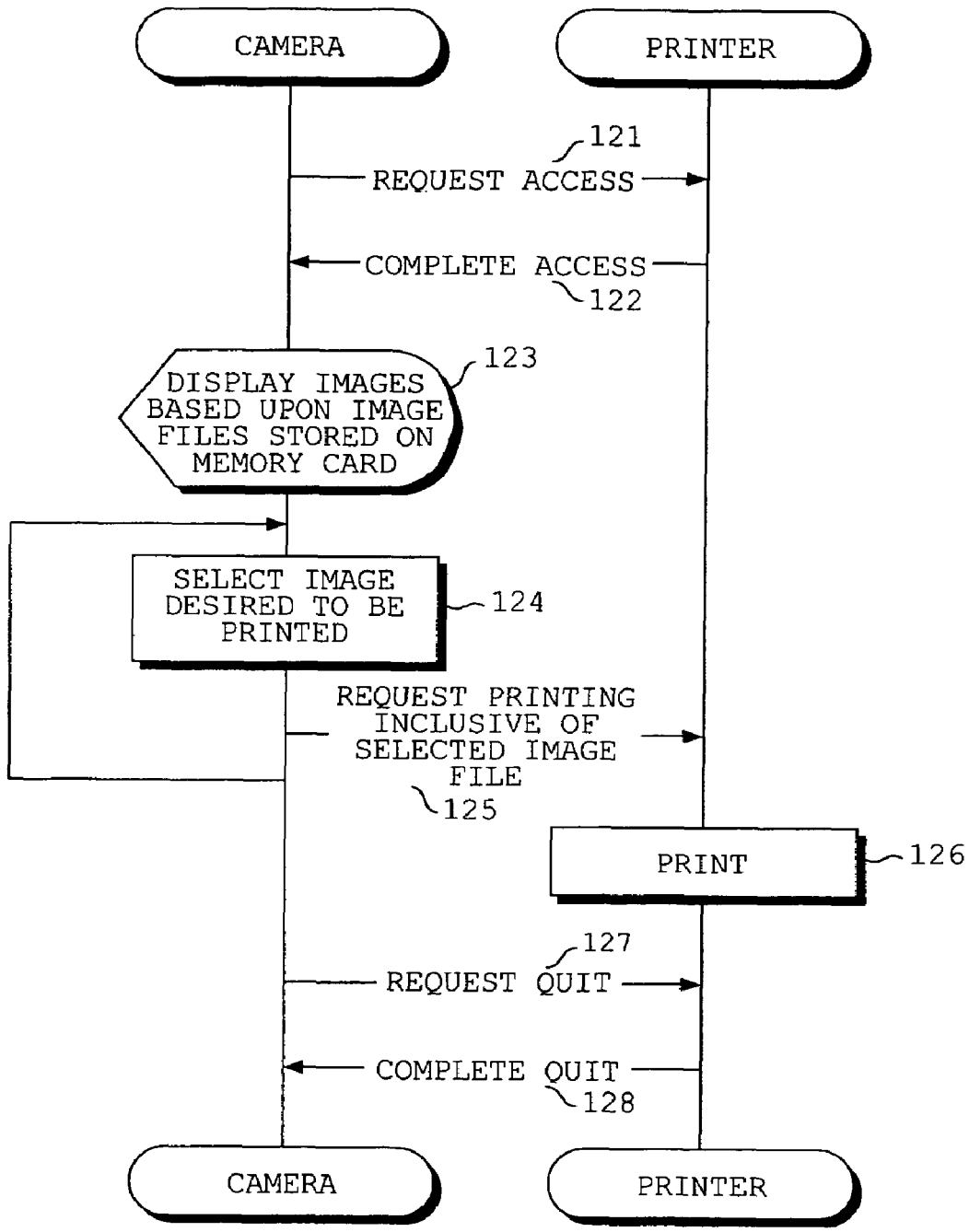
FIG. 20 is a flowchart illustrating the flow of print processing.

FIG. 20 is a flowchart illustrating the flows of processing executed by a digital camera and printer in print processing.

Print processing is processing whereby the owner of a digital camera causes the printer 70 to print an image that is based upon an image file that has been recorded on the memory card 42. This will be described with regard to a case where use is made of the digital camera 1a.

Figure 22:
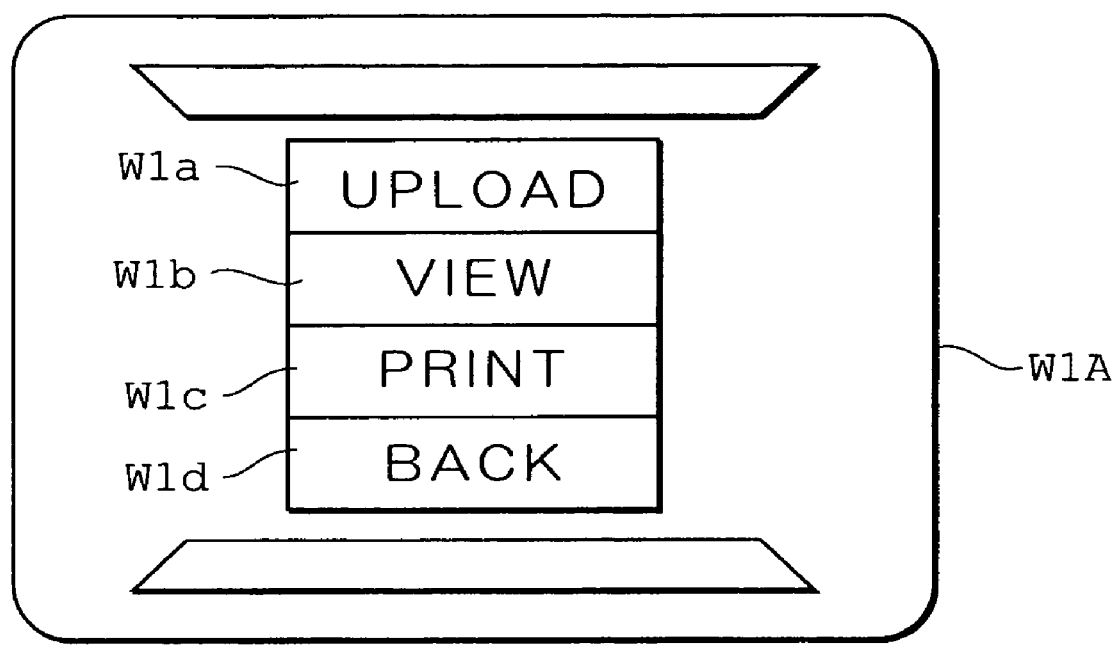
FIG. 22 illustrates an example of an initial screen.

If the communication mode is selected using the mode selection dial 2 of the digital camera 1a, an initial screen W1A (see FIG. 22) is displayed the display screen 7. This screen differs from the initial screen W1 (FIG. 13) of the first embodiment in that a "PRINT" selection area, indicated at W1c, has been added thereto.

Figure 23:
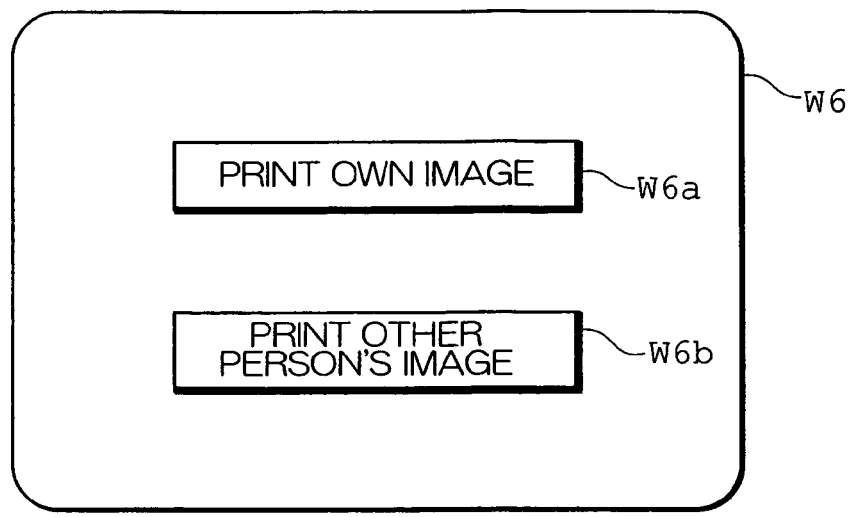
FIG. 23 illustrates an example of a selection screen.

If "PRINT" W1c is selected, a selection screen W6 illustrated in FIG. 23 is displayed. The selection screen W6 is a screen for selecting whether to print an image that is based upon an image file that has been recorded on the memory card 42 inserted into the digital camera 1a or an image that is based upon an image file (stored in the user computer of another utilizing member) possessed by the other utilizing member. If "PRINT OWN IMAGE" W6a is selected, control proceeds to print processing (part 1) shown in FIG. 20.

Access request information is transmitted from the digital camera 1a to the printer 70 via the network (step 121). Printer peer information that has been stored in the non-volatile memory 35 of the digital camera 1a is used to transmit this access request information. The access request information includes information (peer ID and IP address) concerning the digital camera 1a. The printer 70 sends the digital camera 1a information indicating that access has been achieved (step 122).

Images (which are based upon either original image data or thumbnail image data) based upon image files that have been recorded on the memory card 42 are displayed the display screen 7 of the digital camera 1a (step 123; no associated drawing shown).

An image desired to be printed is selected from among the images display (step 124). Print request information (print ordering information) is transmitted from the digital camera 1a to the printer 70 (step 125). The print request information can be made to incorporate the selected image file, an indication as to how many prints (the number of prints) are to be made of the image that is based upon the selected image file, and other information.

In a case where images based upon image files of multiple types are printed, selection of the image and transmission of the print request information are repeated. (It should be noted that even a single transmission of the print request information will suffice.)

Upon receiving the print request information transmitted from the digital camera 1a, the printer 70 prints the image, which is represented by the image file contained in the print request information, based upon the print request information received (step 126).

If quit information is transmitted from the digital camera 1a to the printer 70 (e.g., the quit information is transmitted if the mode selection dial 2 is changed over from the communication mode to another mode) (step 127), the printer 70 transmits quit completion information to the digital camera 1a (step 128). Print processing ends as a result.

The owner of the digital camera 1a would go to the place (a photo lab, etc.) of installation of the printer 70 at a later date to pick up the prints that have been output by the printer 70.

Figure 21:
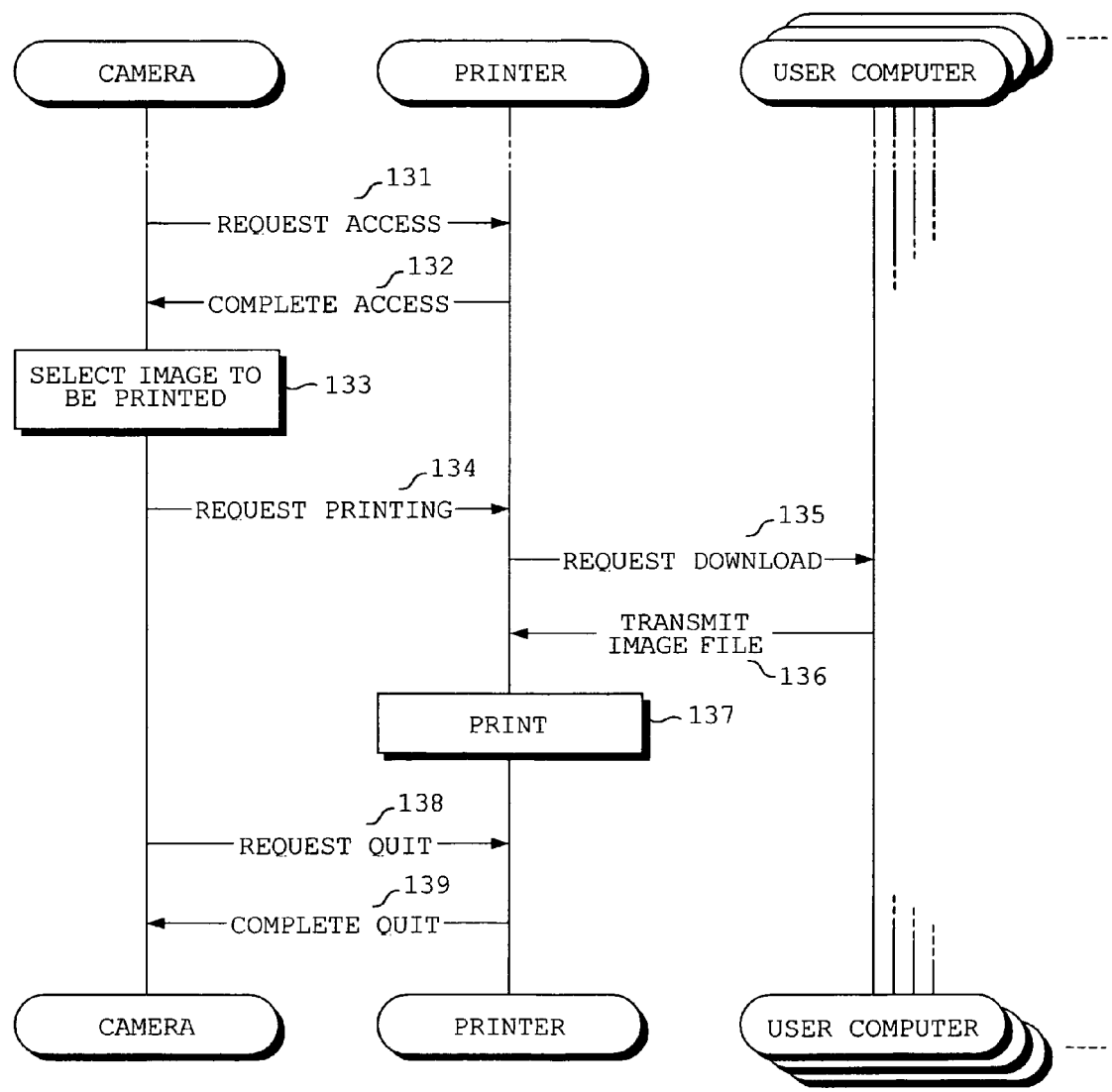
FIG. 21 is a flowchart illustrating the flow of print processing.

FIG. 21 is a flowchart illustrating the flows of processing executed by a digital camera, printer and user computer in print processing. The flowchart of print processing shown in FIG. 21 represents a continuation of processing similar to the processing up to step 112 of the flowchart of processing for acquiring an image file shown in FIG. 12 of the first embodiment. That is, in print processing (part 2) shown in FIG. 21, the processing executed is similar to the processing up to display (step 112) of a thumbnail image of a selected group in image file acquisition processing illustrated in FIG. 12.

Figure 24:
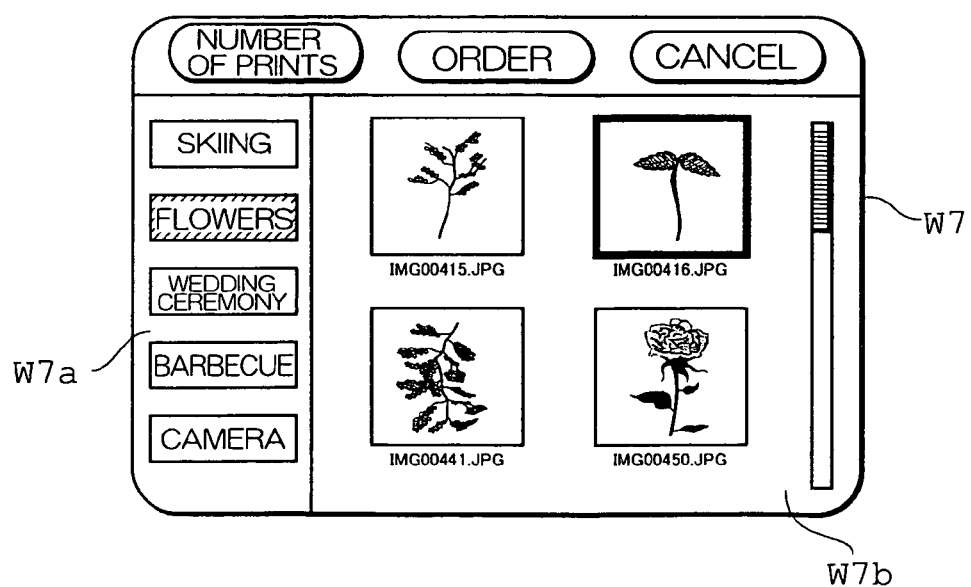
FIG. 24 illustrates an example of a print screen.

Print processing is processing whereby the owner of a digital camera uses the printer 70 to print an image that is based upon an image file possessed by another utilizing member. When "PRINT OTHER PERSON'S IMAGE" W6b is selected on the selection screen W6 shown in FIG. 23, an access request is transmitted from the digital camera 1a to the printer 70 (step 131) and information indicating achievement of access is transmitted from the printer 70 to the digital camera 1a (step 132). A print screen W7 (see FIG. 24) is displayed the display screen 7.

The owner of the digital camera 1a selects one or a plurality of thumbnail images desired to be printed from among thumbnail images being displayed an image display area W7b on the print screen W7 (step 133).

Print request information (print ordering information) relating to the selected thumbnail image is transmitted from the digital camera 1a to the printer 70 (step 134). The print request information includes the IP address that has been linked to the selected thumbnail image (the IP address of the user computer storing the image file that contains the data representing the selected thumbnail image) and the image file name. Of course, data representing the number of prints and other data may be incorporated in the print request information.

Upon receiving the print request information from the digital camera 1a, the printer 70, based upon the IP address included in the print request information received, transmits download request information to the user computer having the image file of the image file name contained in the print request information (step 135). Upon receiving the download request information, the user computer reads the request image file out of the hard disk 56 and transmits the image file to the printer 70 (step 136). The image that is based upon the received image file is printed by the printer 70 (step 137).

If quit information is transmitted from the digital camera 1a to the printer 70 (step 138), then the printer 70 transmits quit completion information to the digital camera 1a (step 139). Print processing ends as a result.

As many apparently widely different embodiments of the present invention can be made without departing from the spirit and scope thereof, it is to be understood that the invention is not limited to the specific embodiments thereof except as defined in the appended claims.

What is claimed is:

1. An image file sharing method implemented by digital cameras and computers possessed by each of a plurality of users, and a center server capable of data communication with the digital cameras and computers via a network, said method comprising the steps of:

said center server storing, on a per-user basis, image group information specifying one or a plurality of image groups to which the user belongs, and access information for accessing each computer;

each computer storing image group information specifying one or a plurality of image groups to which the user possessing said computer belongs;

in upload processing for uploading an image file, said digital camera:

receiving the image group information specifying one or plurality of image groups from its own computer in the possession of the user who possesses this digital camera, and transmitting to its own computer an image file, which has been obtained by image sensing using the digital camera, and image group information in which the image file is to be included; and said own computer, which has received the image file and the image group information, storing the received image file in linkage with an image folder corresponding to the received image group information;

in download processing for downloading an image file, said digital camera:

receiving from said center server the image group information specifying one or plurality of image groups to which the user possessing this digital camera belongs, accepting selection of any one item of image group information from among the items of image group information received, and transmitting the image group information selected to said center server; and said center server transmitting, to said digital camera, access information for accessing other computers possessed by one or a plurality of other users who belong to the image group specified by the image group information received;

the digital camera that has received this access information transmitting the selected image group information to another computer based upon the access information received; and the other computer that has received the image group information from the digital camera transmitting an image file, which has been linked to an image folder corresponding to the image group information received, to said digital camera.

2. A digital camera used in an image file sharing system constituted by said digital camera and a computer possessed by each of a plurality of users, and a center server capable of data communication with the digital cameras and computers via a network, wherein said center server has a management information storage device for storing, on a per-user basis, management information that includes image group information specifying one or a plurality of image groups to which the user belongs and access information for accessing each computer, and each computer has an image group information storage device for storing image group information specifying one or a plurality of image groups to which a user possessing said computer belongs, and an image file storage device for storing an image file, which is transmitted from a digital camera, in linkage with an image folder corresponding to image group information transmitted from the digital camera together with the image file, said digital camera comprising:

first image group information receiving means for receiving the image group information specifying one or plurality of image groups from its own computer in the possession of the user who possesses this digital camera;

image file transmitting means for transmitting an image file, which has been obtained by image sensing using the digital camera, and image group information in which the image file is to be included, to its own computer;

second image group information receiving means for receiving from said center server the image group information specifying one or plurality of image groups to which the user possessing this digital camera belongs;

image group information selecting means for accepting selection of any one item of image group information from among the items of image group information received;

image group information transmitting means for transmitting the image group information selected to said center server;

access information receiving means for receiving access information, which is transmitted from said center server, for accessing other computers possessed by one or a plurality of other users who belong to the image group specified by the image group information received;

accessing means for transmitting the selected image group information to another computer based upon the access information received; and image file receiving means for receiving an image file, which has been linked to an image folder corresponding to the image group information, transmitted from another computer that has received the image group information from the digital camera.

3. The digital camera according to claim 2, further comprising image group name display means for displaying an image group name on a display screen of a display unit based upon image group information specifying one or a plurality of image groups received by said first image group information receiving means and said second image group information receiving means.

4. The digital camera according to claim 2, further comprising:

a removable memory card; and memory card control means for recording an image file, which has been received by said image file receiving means, on said memory card.

5. The digital camera according to claim 2, wherein the image file includes original image data and thumbnail image data, and said digital camera further comprises:

thumbnail image data receiving means for receiving thumbnail image data, which is transmitted from another user computer that has received the image group information transmitted by said accessing means, contained in an image file that has been linked to an image folder corresponding to an image group identified by the image group information;

thumbnail image display means for displaying a thumbnail image represented by the thumbnail image data;

desired-image selecting means for selecting an image, which is desired to be downloaded, from among thumbnail images display by said thumbnail image display means; and download request transmitting means for transmitting a download request to another computer having the image selected;

said image file receiving means receiving an image file, which is desired to be downloaded, transmitted from another computer that has received a download request.

6. In an image file sharing system constituted by digital cameras and computers possessed by each of a plurality of users and a center server capable of data communication with the digital cameras and computers via a network, said center server comprises:

image group information/access information storage means for storing, on a per-user basis, image group information specifying one or a plurality of image groups to which the user belongs and access information for accessing each of the computers;

image group information transmitting means for transmitting to said digital camera the image group information specifying one or plurality of image groups to which the user possessing the digital camera belongs;
image group information receiving means for receiving any one item of image group information transmitted from a digital camera; and
access information transmitting means for transmitting to said digital camera access information for accessing other computers possessed by one or a plurality of other users who belong to the image group specified by the image group information received.

* * * * *